US012312863B2

(12) United States Patent
MacKarvich

(10) Patent No.: US 12,312,863 B2
(45) Date of Patent: May 27, 2025

(54) METHOD OF ASSEMBLING A MODULAR LADDER SYSTEM

(71) Applicant: Charles J. MacKarvich, Atlanta, GA (US)

(72) Inventor: Charles J. MacKarvich, Atlanta, GA (US)

( * ) Notice: Subject to any disclaimer, the term of this patent is extended or adjusted under 35 U.S.C. 154(b) by 0 days.

(21) Appl. No.: 18/542,420

(22) Filed: Dec. 15, 2023

(65) Prior Publication Data

US 2024/0117675 A1 Apr. 11, 2024

Related U.S. Application Data

(62) Division of application No. 18/097,869, filed on Jan. 17, 2023, now Pat. No. 11,885,180.

(60) Provisional application No. 63/300,564, filed on Jan. 18, 2022.

(51) Int. Cl.

| | |
|---|---|
| ***E06C 5/04*** | (2006.01) |
| ***E06C 5/36*** | (2006.01) |
| ***E06C 7/18*** | (2006.01) |
| *E06C 5/42* | (2006.01) |

(Continued)

(52) U.S. Cl.

CPC .................. *E06C 5/04* (2013.01); *E06C 5/36* (2013.01); *E06C 7/183* (2013.01); *E06C 5/42* (2013.01); *E06C 7/42* (2013.01); *E06C 7/50* (2013.01)

(58) Field of Classification Search

CPC ..... E06C 5/04; E06C 5/36; E06C 5/42; E06C 7/183; E06C 7/42; E06C 7/50; E06C 7/182; E06C 7/181; E06C 7/18

See application file for complete search history.

(56) References Cited

U.S. PATENT DOCUMENTS 162,856 A * 5/1875 Peterson .................. E06C 5/04 81/110

165,618 A * 7/1875 Rowland .................. E06C 5/04 182/68.1

(Continued)

OTHER PUBLICATIONS

MacKarvich, Charles J.; Non-Final Office Action for U.S. Appl. No. 18/097,869, filed Jan. 17, 2023, mailed Jun. 2, 2023, 26 pgs.

(Continued)

*Primary Examiner* — Daniel P Cahn

*Assistant Examiner* — Shiref M Mekhaeil

(74) *Attorney, Agent, or Firm* — Buchalter, a Professional Corporation

(57) ABSTRACT

A method of assembling a modular ladder system includes providing the modular ladder system in an unassembled configuration, the modular ladder system comprising a plurality of ladder modules stacked on a ladder base and comprising first and second ladder modules each defining a first end and a second end; removing the second ladder module from the ladder base; coupling the first end of the first ladder module to the second end of the second ladder module to define a ladder, the ladder defining a first ladder end and a second ladder end, the second end of the first ladder module defining the second ladder end and coupled to the ladder base; elevating the first ladder end of the ladder to orient the ladder at an angle relative to the ladder base; and engaging the first ladder end with an elevated support surface of an elevated structure.

21 Claims, 28 Drawing Sheets

(51) Int. Cl.
*E06C 7/42* (2006.01)
*E06C 7/50* (2006.01)

(56) References Cited

U.S. PATENT DOCUMENTS 175,095 A * 3/1876 Hoehn .................... E04G 1/152 182/222
204,893 A * 6/1878 Gibbons ................... E06C 5/04 182/67.1
303,520 A * 8/1884 Johnson .................... E06C 5/04 182/67.1
361,202 A * 4/1887 Arnold et al. ............ E06C 5/04 182/208
493,977 A * 3/1893 Childs ....................... E06C 1/32 182/24
535,082 A * 3/1895 Snell ......................... E06C 9/10 182/208
665,780 A * 1/1901 Hayward ................ E06C 7/083 182/218
876,542 A * 1/1908 Haight ...................... E21B 7/02 173/39
976,074 A * 11/1910 Hartman ................... E06C 1/32 182/24
1,067,170 A * 7/1913 Hewett ..................... E06C 1/20 182/172
1,599,761 A * 9/1926 Gunn ........................ B60S 9/04 254/427
1,763,766 A 6/1930 Erwin
1,776,565 A * 9/1930 Morton ..................... E04G 3/28 182/163
2,171,284 A 8/1939 Wortelmann
2,341,965 A * 2/1944 Wagner ..................... B60T 7/20 280/487
2,665,951 A 1/1954 Bobst
2,743,049 A * 4/1956 Flesher ..................... E06C 7/42 211/175
2,751,258 A 6/1956 Brattland
2,857,087 A * 10/1958 Pratt ......................... E06C 1/22 182/156
2,880,772 A 4/1959 Polchow
3,004,621 A 10/1961 Yench, Sr.
3,023,833 A 3/1962 Mauritz
3,084,953 A * 4/1963 McGregor ............... B60D 1/66 238/10 R
3,084,964 A 4/1963 Ruth
3,236,331 A 2/1966 Green
3,273,911 A * 9/1966 Waldie ..................... B60D 1/32 280/455.1
3,367,080 A 2/1968 McClelland
3,599,784 A * 8/1971 Rossi ..................... B65G 21/14 198/313
3,698,511 A * 10/1972 Dohan ...................... E04G 1/14 182/119
3,709,323 A * 1/1973 Trible ....................... E06C 1/14 182/1
3,995,714 A * 12/1976 Brookes .................. E06C 1/381 182/189
4,026,079 A 5/1977 Morris
4,044,857 A * 8/1977 Guerette ................. E06C 1/397 182/127
4,045,040 A * 8/1977 Fails ....................... B62B 5/068 182/20
4,083,427 A 4/1978 Box
4,143,740 A * 3/1979 Matthews ............. E04F 11/025 403/312
4,202,428 A * 5/1980 Hickman ................ E06C 1/381 182/162
4,428,456 A * 1/1984 Rohde ................... A01M 31/02 182/20
4,462,197 A 7/1984 D'Alessio et al.
4,481,748 A 11/1984 D'Alessio et al.
4,614,252 A * 9/1986 Tarner ....................... E06C 1/34 182/127
4,684,314 A * 8/1987 Luth .................... B65G 41/005 187/244
4,761,847 A * 8/1988 Savage .................. B65G 69/30 52/645
4,830,144 A 5/1989 Werner
4,899,849 A * 2/1990 Levi ...................... F16B 7/1427 182/172
5,033,584 A * 7/1991 Battle ....................... E06C 1/22 182/208
5,064,020 A * 11/1991 Eagleson .................. E06C 1/34 182/20
5,105,908 A * 4/1992 Freund .................. A01M 31/02 182/20
5,109,954 A * 5/1992 Skyba ....................... E06C 1/10 182/189
5,195,611 A * 3/1993 Untz ....................... E06C 1/397 182/187
5,236,062 A * 8/1993 Laney ....................... E06C 5/02 224/511
5,242,030 A * 9/1993 Lobozzo ................... E06C 1/34 182/20
5,253,732 A * 10/1993 Daniels ................... E06C 1/397 182/20
5,265,698 A * 11/1993 Friedel, Jr. ................ E06C 7/44 182/201
5,282,520 A * 2/1994 Walker ...................... E06C 1/39 182/21
5,297,653 A * 3/1994 Wurtz ................... B66F 11/042 187/244
5,564,524 A * 10/1996 Thaggard ................ E06C 1/393 182/187
5,566,780 A * 10/1996 Bambrough .............. E06C 1/34 182/20
5,590,738 A * 1/1997 Hunt ......................... E06C 1/34 182/187
5,839,538 A * 11/1998 Magyar ................... E06C 1/393 182/20
6,053,278 A * 4/2000 Myers ................... A01M 31/02 182/20
6,053,284 A * 4/2000 Fountain ................... E06C 7/42 182/180.2
6,138,792 A * 10/2000 Morris ...................... E06C 1/10 182/178.3
6,283,496 B1 * 9/2001 Dickmann ............. B62B 1/208 280/655
6,516,918 B2 * 2/2003 Hess ......................... E06C 7/42 182/20
6,811,180 B1 * 11/2004 Molliere ................. E06C 1/397 280/30
7,168,521 B1 * 1/2007 Murray ..................... E06C 5/04 182/127
7,237,649 B2 * 7/2007 Harmston ................. E06C 1/10 182/93
7,946,607 B1 * 5/2011 Neal, Jr. ................ B60D 1/143 280/495
8,424,639 B1 * 4/2013 Davis ...................... E06C 1/397 182/20
8,448,748 B2 * 5/2013 Allred, III .............. E06C 7/087 182/115
8,579,082 B1 * 11/2013 Owens .................... E06C 1/397 182/127
8,695,761 B1 * 4/2014 Berkbuegler ........... E06C 7/188 182/115
8,844,674 B2 * 9/2014 Smith ....................... E06C 1/38 182/217
9,109,394 B2 * 8/2015 Hernandez ................ E06C 5/04
9,732,556 B2 * 8/2017 Priest ...................... E06C 1/381
9,732,557 B2 * 8/2017 Landers .................. E06C 1/397
9,803,422 B2 * 10/2017 Johnson .................. E06C 1/397
10,010,068 B2 * 7/2018 Berkbuegler ......... A01M 31/02
10,487,577 B1 * 11/2019 Fuqua .................... E06C 1/383
10,532,827 B2 * 1/2020 Springer .................... E06C 5/04
10,669,777 B2 * 6/2020 Bright ........................ E06C 7/10
11,885,180 B2 1/2024 MacKarvich
2002/0036116 A1 * 3/2002 Hess ......................... E06C 1/10 182/20

(56) References Cited

U.S. PATENT DOCUMENTS

2004/0222043 A1* 11/2004 Fortner ..................... E06C 1/10 182/178.3
2005/0224288 A1* 10/2005 Chesness .............. A01M 31/02 182/115
2007/0169994 A1* 7/2007 Oftedahl ................... E06C 1/39 182/20
2009/0007348 A1* 1/2009 Woodmansee, III ........................ E01D 15/124 182/21
2012/0273303 A1* 11/2012 Perkins ................... E06C 7/188 182/129
2012/0292130 A1* 11/2012 Larson .................... E06C 1/397 182/39
2013/0043092 A1* 2/2013 Clardy ...................... E06C 9/14 182/163
2013/0319794 A1* 12/2013 Hernandez ................ E06C 5/02 182/129
2017/0167196 A1* 6/2017 Johnson .................. E06C 1/397
2017/0275888 A1* 9/2017 Honeycutt ............ E04F 11/025
2017/0318799 A1* 11/2017 Stilwell ................. A01M 31/00
2018/0094484 A1* 4/2018 Frame ....................... E06C 1/20
2018/0346149 A1* 12/2018 Springer ................... E06C 5/06
2021/0079727 A1* 3/2021 Garcia ...................... E06C 7/08
2023/0074662 A1 3/2023 Reinoso
2023/0228150 A1 7/2023 MacKarvich
2024/0117676 A1 4/2024 MacKarvich

OTHER PUBLICATIONS

Mackarvich, Charles J.; Notice of Allowance for U.S. Appl. No. 18/097,869, filed Jan. 17, 2023, mailed Sep. 18, 2023, 16 pgs.

Mackarvich, Charles J.; Requirement for Restriction/Election for U.S. Appl. No. 18/097,869, filed Jan. 17, 2023, mailed May 4, 2023, 7 pgs.

Non-Final Office Action for U.S. Appl. No. 18/542,432, dated Feb. 14, 2025, 13 pages.

* cited by examiner

METHOD OF ASSEMBLING A MODULAR LADDER SYSTEM

CROSS-REFERENCE TO RELATED APPLICATIONS

The present application is a divisional of U.S. application Ser. No. 18/097,869, filed Jan. 17, 2023, which claims the benefit of U.S. Provisional Application No. 63/300,564, filed Jan. 18, 2022, each of which is hereby specifically incorporated by reference herein in its entirety.

TECHNICAL FIELD

This disclosure relates to ladders. More specifically, this disclosure relates to modular ladder system.

BACKGROUND

Ladders are commonly used to reach portions of an elevated structure not otherwise accessible. Among many other uses, a ladder can allow a user to reach such an elevated structure to perform maintenance and repair or as part of a building process. However, ladders are often fixed in length and therefore cannot easily accommodate elevated structures of varying heights. Additionally, long ladders can be difficult to transport due to their size.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a modular ladder system comprising a first ladder module; and a second ladder module, the modular ladder system configurable in an unassembled configuration and an assembled configuration; wherein, in the unassembled configuration, the first ladder module is detached from the second ladder module, and in the assembled configuration, the first ladder module is coupled to the second ladder module to define a ladder.

Also disclosed is a modular ladder system includes a first ladder module comprising a first plurality of ladder steps; a second ladder module comprising a second plurality of ladder steps; and a ladder base, the modular ladder system is configurable in an unassembled configuration and an assembled configuration; wherein: in the unassembled configuration, the first ladder module is detached from the second ladder module and the first and second ladder modules are stacked on the ladder base; and in the assembled configuration, the first ladder module is coupled to the ladder base and the second ladder module is attached to the first ladder module opposite the ladder base to define a ladder extending upward from the ladder base.

Additionally, a method of assembling a modular ladder system is disclosed, the method comprising providing the modular ladder system in an unassembled configuration, the modular ladder system comprising a plurality of ladder modules stacked on a ladder base, the plurality of ladder modules comprising a first ladder module and a second ladder module each defining a first end and a second end opposite the first end; removing the second ladder module from the ladder base; coupling the first end of the first ladder module to the second end of the second ladder module to define a ladder, the ladder defining a first ladder end and a second ladder end opposite the first ladder end, the second end of the first ladder module defining the second ladder end and coupled to the ladder base; elevating the first ladder end of the ladder to orient the ladder at an angle relative to the ladder base; and engaging the first ladder end with an elevated support surface of an elevated structure.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
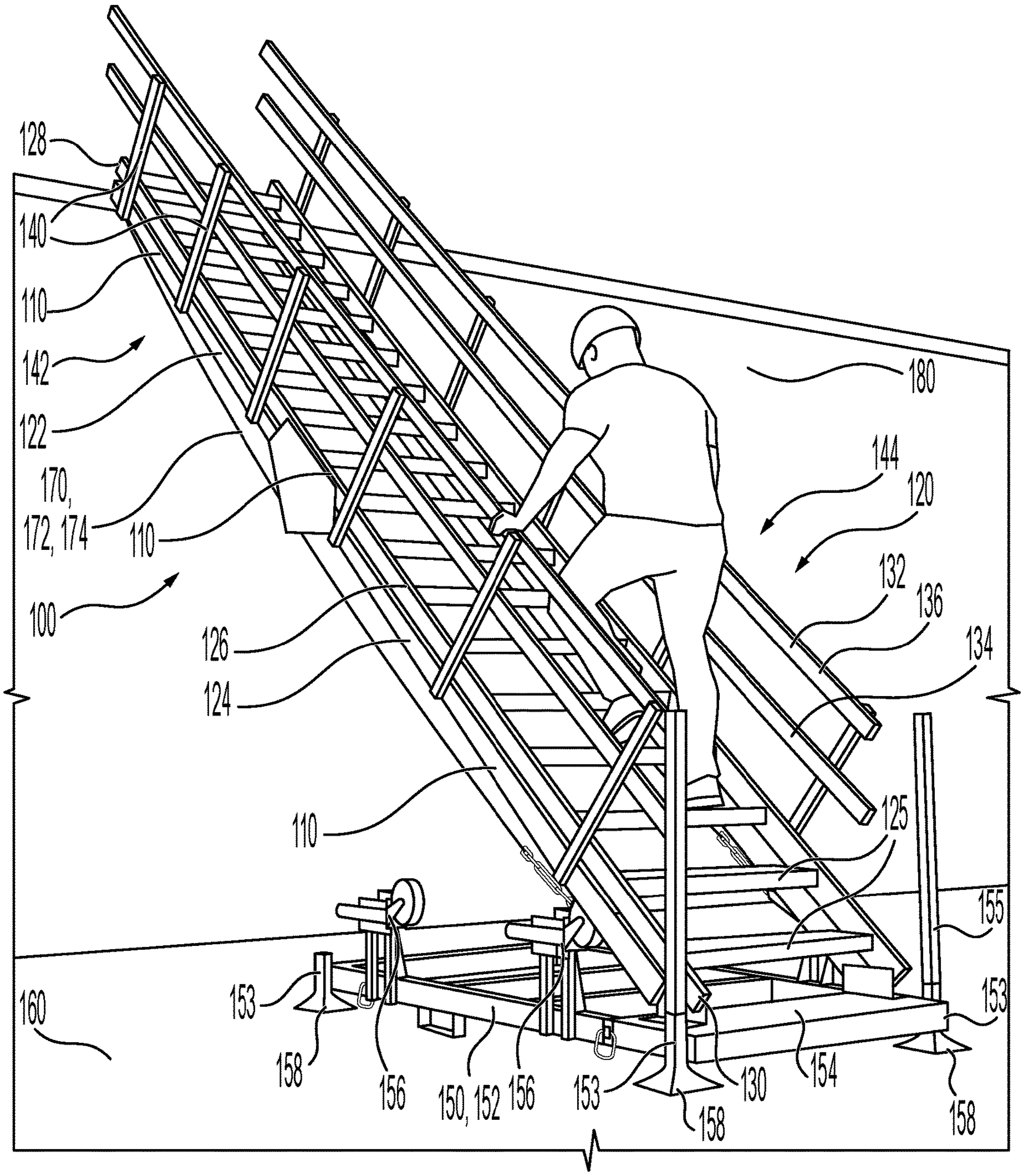
FIG. 1 is a perspective view of a modular ladder system in an assembled configuration, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a modular ladder system and associated methods, systems, devices, and various apparatus. Example aspects of the modular ladder system can comprise a first ladder module and a second ladder module. It would be understood by one of skill in the art that the modular ladder system is described in but a few exemplary embodiments among many. No particular terminology or description should be considered limiting on the disclosure or the scope of any claims issuing therefrom.

Figure 2:
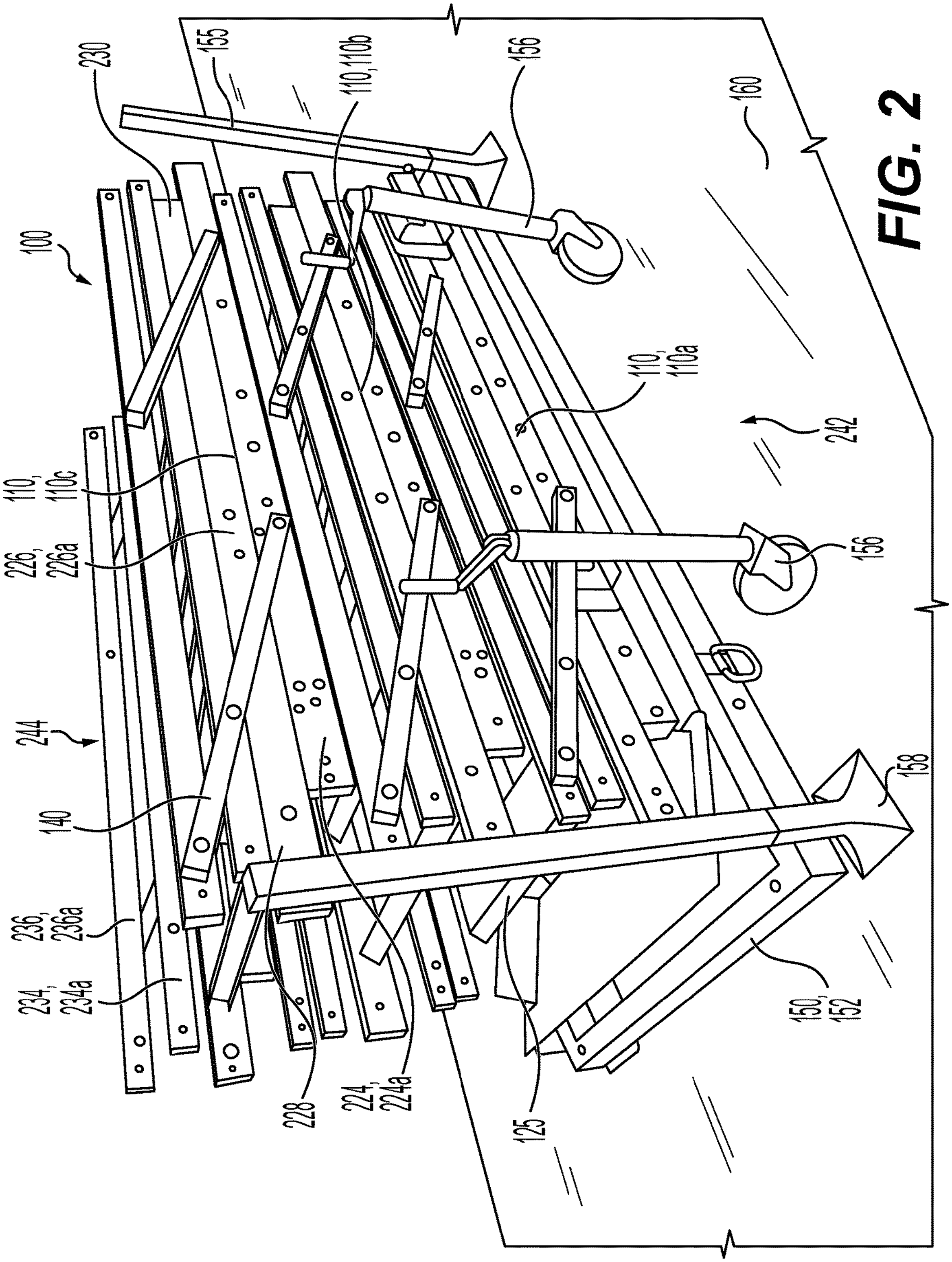
FIG. 2 is a perspective view of the modular ladder system of FIG. 1 in an unassembled configuration.

FIG. 1 is a perspective view of a modular ladder system 100, in accordance with one aspect of the present disclosure. The modular ladder system 100 can be used to reach portions of an elevated structure 180 that may otherwise be unreachable. The modular ladder system 100 can be configured in an assembled configuration, as shown in FIG. 1, and an unassembled configuration, as shown in FIG. 2. According to example aspects, the modular ladder system 100 can comprise a plurality of ladder modules 110 and a ladder base 150. In the present aspect, the modular ladder system 100 can comprise three of the ladder modules 110. Other aspects of the modular ladder system 100 can comprise more or fewer ladder modules 110, as described in further detail below. In the assembled configuration of the modular ladder system 100, the plurality of ladder modules 110 can define a ladder 120, as shown.

As described in further detail below, each of the ladder modules 110 can be disposed in an expanded configuration when the modular ladder system 100 is assembled, as shown in FIG. 1, and a collapsed configuration when the modular ladder system 100 is unassembled. The ladder base 150 can be configured to rest on a ground surface 160, and the ladder 120 can extend upward therefrom. In the present aspect, the ladder 120 can be oriented at an acute angle relative to horizontal, such as, for example, at about 45°. However, in other aspects, the ladder 120 can be oriented any other suitable angle. Furthermore, in some aspects, the angle of the ladder 120 can be selectively adjustable to accommodate elevated structures 180 of varying heights.

Example aspects of the ladder 120 can comprise a step portion 122 and an upper support portion 132 supported above the step portion 122. The step portion 122 can comprise a pair of first step rails 124, a pair of second step rails 126, and a plurality of ladder steps 125 extending between the first step rails 124 and the second step rails 126. Each of the second step rails 126 can be vertically offset from and parallel to a corresponding one of the first step rails 124. In the present aspect, a corresponding pair of the first and second step rails 124, 126 can be disposed at a first ladder side 142 (e.g., a left side) of the ladder 120, and another corresponding pair of the first and second step rails 124, 126 can be disposed at a second ladder side 144 (e.g., a right side) of the ladder 120. Each of ladder steps 125 can extend laterally between the first ladder side 142 and the second ladder side 144. In other aspects, the step portion 122 can comprise the first step rails 124 only, and the ladder steps 125 can be affixed thereto. According to example aspects, the ladder steps 125 can be oriented about horizontally in the assembled configuration. A user can step on the ladder steps 125 as they ascend or descend the ladder 120. Furthermore, according to example aspects, the step portion 122 (e.g., the first step rails 124 and/or the second step rails 126) can be coupled to the ladder base 150 to secure the ladder 120 thereto in the assembled configuration.

The upper support portion 132 can comprise a pair of guard rails 134 and a pair of hand rails 136. Each of the hand rails 136 can be vertically offset from and about parallel to a corresponding one of the guard rails 134. Additionally, as shown, each of the guard rails 134 and the hand rails 136 can be about parallel with the first step rails 124 and the second step rails 126. In the present aspect, a corresponding pair of the guard rails 134 and hand rails 136 can be disposed at the first ladder side 142 of the ladder 120, and another corresponding pair of the guard rails 134 and hand rails 136 can be disposed at the second ladder side 144. Each of the guard rails 134 and the hand rails 136 can be supported over the step portion 122 of the ladder 120 by one or more linkages 140, as described in further detail below. According to example aspects, each of the guard rails 134 can be disposed between the step portion 122 and the corresponding hand rail 136, as shown. The guard rails 134 and the hand rails 136 can provide lateral support to a user as they ascend and descend the ladder 120 to prevent the user from falling over the first ladder side 142 and/or the second ladder side 144. The hand rails 136 can also provide stable gripping locations at both the first and second ladder sides 142, 144 for a user to grip as they ascend and descend the ladder 120.

The ladder base 150 can be configured to rest on and support the ladder 120 above the ground surface 160. Example aspects of the ladder base 150 can comprise a base frame 152, and a lower end 130 of the step portion 122 can engage the base frame 152 to affix the ladder 120 thereto. An upper end 128 of the step portion 122 opposite the lower end 130 can engage the elevated structure 180. In example aspects, the modular ladder system 100 can comprise a lift mechanism 170, which can lift the ladder 120 upward to orient the ladder 120 at a desired angle and elevation. Thus, the lift mechanism 170 can allow the angle and elevation of the ladder 120 to be adjusted to accommodate elevated structures 180 of varying heights. In some aspects, the lift mechanism 170 can be a pulley system 172 comprising a pulley 174. According to example aspects, each of the ladder modules 110 can first be assembled together to define the ladder 120, and then the pulley system 172 can raise the ladder 120 relative to the ladder base 150 to the desired angle and elevation. In some aspects, the ladder base 150 can further comprise a step platform 154 coupled to the base frame 152, and the step platform 154 can allow a user to step on to or off of the ladder base 150 when ascending or descending the ladder 120. Additionally, the ladder base 150 can comprise a substantially vertical base post 155 extending upward from some or all corner 153 of the base frame 152.

In some aspects, the ladder base 150 can be configured to roll, slide, glide, or otherwise move along the ground surface 160 to transport the modular ladder system 100 and/or to position the modular ladder system 100 at a desired location relative to the elevated structure 180. For example, in the present aspect, the ladder base 150 can comprise one or more wheel assemblies 156 configured to roll the ladder base 150 along the ground surface 160. Once in the desired position with the upper end 128 of the step portion 122 engaging the elevated structure 180, the ladder base 150 can be secured in place to prevent movement of the modular ladder system 100. In some aspects, each of the wheel assemblies 156 can be elevated to disengage the ground surface 160. In the present aspect, the wheel assemblies 156 can be disengaged from the ground surface 160, and engagement feet 158 of the ladder base 150 can contact the ground surface 160 to support the ladder base 150 thereon. In other aspects, the ladder base 150 can rest directly on the ground surface 160. Furthermore, in other aspects, the wheel assemblies 156 can comprise a braking system to arrest movement of the ladder base 150 on the ground surface 160.

FIG. 2 illustrates the modular ladder system 100 in the unassembled configuration, in accordance with an example aspect of the present disclosure, which allows for a compact unassembled unit that is easy to transport. As shown, each of the ladder modules 110 can be detached from one another in the unassembled configuration, such that each ladder module 110 is completely independent of the other ladder modules 110. Each of the ladder modules 110 can comprise a pair of first step rail segments 224 and a pair of second step rail segments 226. A corresponding pair of the first step rail segments 224 and second step rail segments 226 can be disposed at a first module side 242 of each ladder module 110, and another corresponding pair of the first step rail segments 224 and second step rail segments 226 can be disposed at a second module side 244 of each ladder module 110. When the modular ladder system 100 is assembled, the first step rail segments 224 of each ladder module 110 can be aligned with the corresponding first step rail segments 224 of the other ladder modules 110 to define the first step rails 124. Similarly, the second step rail segments 226 of each ladder module 110 can be aligned with the corresponding second step rail segments 226 of the other ladder modules 110 to define the second step rails 126 in the assembled configuration. Each of the ladder modules 110 can further comprise one or more of the ladder steps 125. Each of the ladder steps 125 of the ladder module 110 can extend between the first step rail segments 224 and the second step rail segments 226.

Each of the ladder modules 110 can further comprise a pair of pair of hand rail segments 236 and a pair of guard rail segments 234. A corresponding pair of the hand rail segments 236 and guard rail segments 234 can be disposed at the first module side 242 of each ladder module 110, and another corresponding pair of the hand rail segments 236 and guard rail segments 234 can be disposed at the second module side 244 of each ladder module 110. When the modular ladder system 100 is assembled, the hand rail segments 236 of each ladder module 110 can be aligned with the corresponding hand rail segments 236 of the other ladder modules 110 to define the hand rails 136. Similarly, the guard rail segments 234 of each ladder module 110 can be aligned with the corresponding guard rail segments 234 of the other ladder modules 110 to define the guard rails 134 in the assembled configuration.

Thus, referring to the first module side 242 of the ladder modules 110, which can be a left side in the present aspect, each ladder module 110 can comprise a left first step rail segment 224*a*, a left second step rail segments 226*a*, a left guard rail segment 234*a*, and a left hand rail segment 236*a*. Each of the left first step rail segment 224*a*, left second step rail segments 226*a*, left guard rail segment 234*a*, and left hand rail segment 236*a* can be coupled to one another by at least one of the linkages 140. For example, in the present aspect, the corresponding left segments 224*a*, 226*a*, 324*a*, 326*a* can be coupled together by two of the linkages 140. However, in other aspects, the left segments 224*a*, 226*a*, 324*a*, 326*a* can be coupled together by more or fewer linkages 140. According to example aspects, each of the left segments 224*a*, 226*a*, 324*a*, 326*a* can be pivotably coupled to the corresponding linkages 140, such that the left segments 224*a*, 226*a*, 324*a*, 326*a* can rotate relative to the linkages 140. When the modular ladder system 100 is unassembled, each of the ladder modules 110 can be disposed in a collapsed configuration. In the collapsed configuration, each of the left segments 224*a*, 226*a*, 324*a*, 326*a* can be pivoted inward towards one another at the linkages 140 to substantially stack on top of one another, as shown. In the expanded configuration, as shown in FIG. 1, the linkages 140 can allow the left segments 224*a*, 226*a*, 324*a*, 326*a* to pivot outward to offset the rails from one another. In example aspect, the linkages 140 can be configured with a stop mechanism to prohibit the left segments 224*a*, 226*a*, 324*a*, 326*a* from pivoting past the expanded position. In some aspects, the linkages 140 can be oriented about perpendicular to each of the left segments 224*a*, 226*a*, 324*a*, 326*a* in the expanded configuration. The second module side 244 (i.e., the right side) of each ladder module 110 can be arranged in the same manner as the first module side 242 (i.e., the left side).

In some aspects, in the unassembled configuration, each of the independent ladder modules 110 can be stacked vertically on top of one another and can be supported on the ladder base 150 for easy transportation of the unassembled modular ladder system 100. To reconfigure the modular ladder system 100 from the unassembled configuration to the assembled configuration, each of the independent ladder modules 110 can be connected together in series to define the ladder 120 (shown in FIG. 1). According to example aspects, each of the ladder modules 110 can telescopingly engage one or more adjacent ladder modules 110. For example, an upper module end 228 of a first ladder module 110*a* can telescopingly engage a lower module end 230 of a second ladder module 110*b*, the lower module end 230 of a third ladder module 110*c* can telescopingly engage the upper module end 228 of the second ladder module 110*b*, and so on, to connect each of the ladder modules 110 together. More ladder modules 110 can be assembled together to construct a longer ladder 120, while fewer modules 110 can be assembled together to construct a shorter ladder 120.

In example aspects, any or all of the first step rail segments 224, second step rail segments 226, guard rail segments 234, and hand rail segments 236 can telescopingly engage the corresponding first step rail segments 224, second step rail segments 226, guard rail segments 234, and hand rail segments 236 of the adjacent ladder module(s) 110. For example, in a particular aspect, the first step rail segments 224 of each ladder module 110 can telescoping engage the first step rail segments 224 of the adjacent(s) ladder modules 110, and the second step rail segments 226 of each ladder module 110 can telescoping engage the second step rail segments 226 of the adjacent ladder module (s) 110. In some aspects, the guard rail segments 234 of each ladder module 110 can also telescoping engage the guard rail segments 234 of the adjacent ladder module(s) 110, and the hand rail segments 236 of each ladder module 110 can telescoping engage the hand rail segments 236 of the adjacent ladder module(s) 110.

Figure 3:
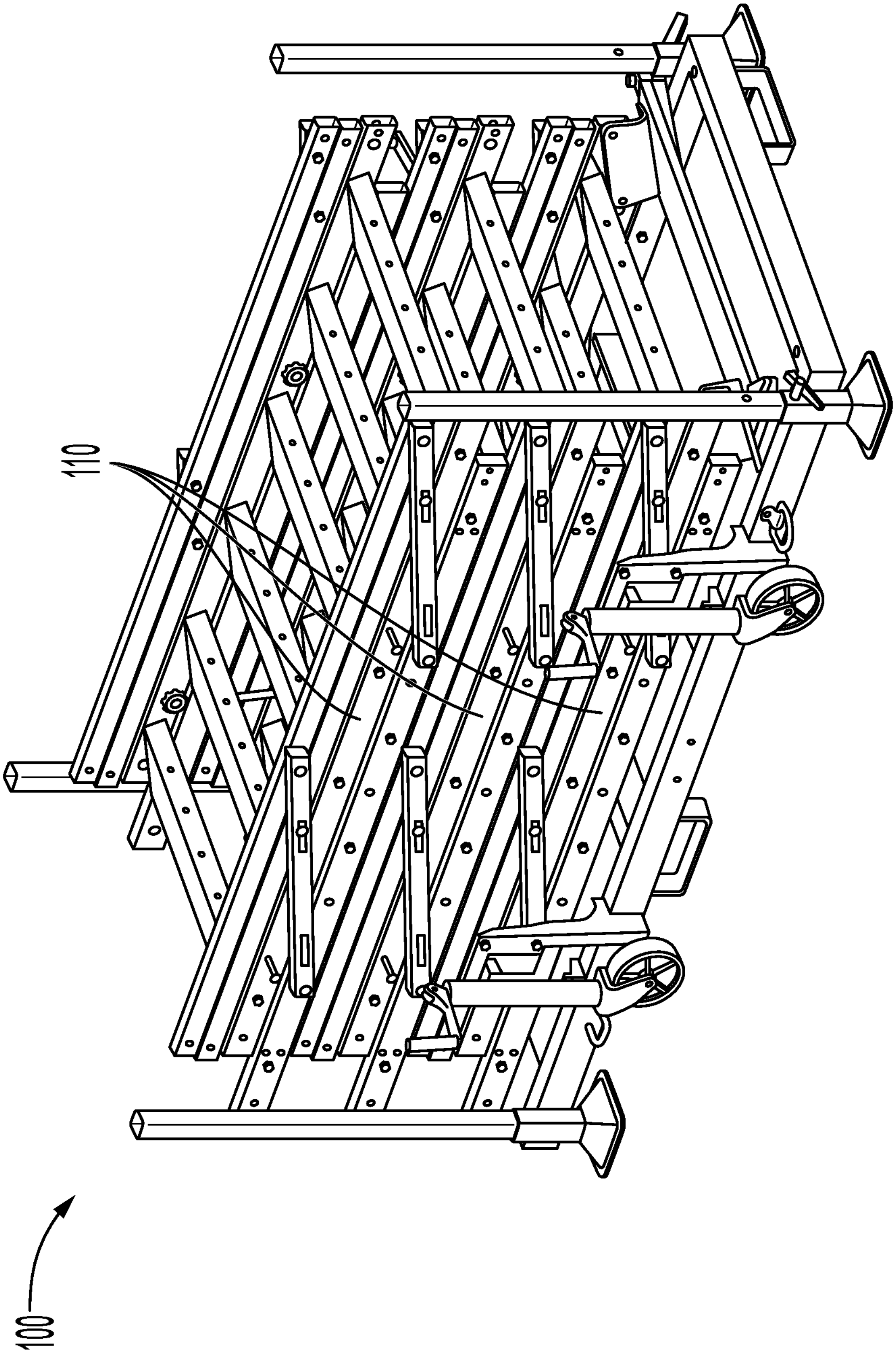
FIG. 3 is a perspective view of the modular ladder system in the unassembled configuration, in accordance with another aspect of the present disclosure.
Figure 4:
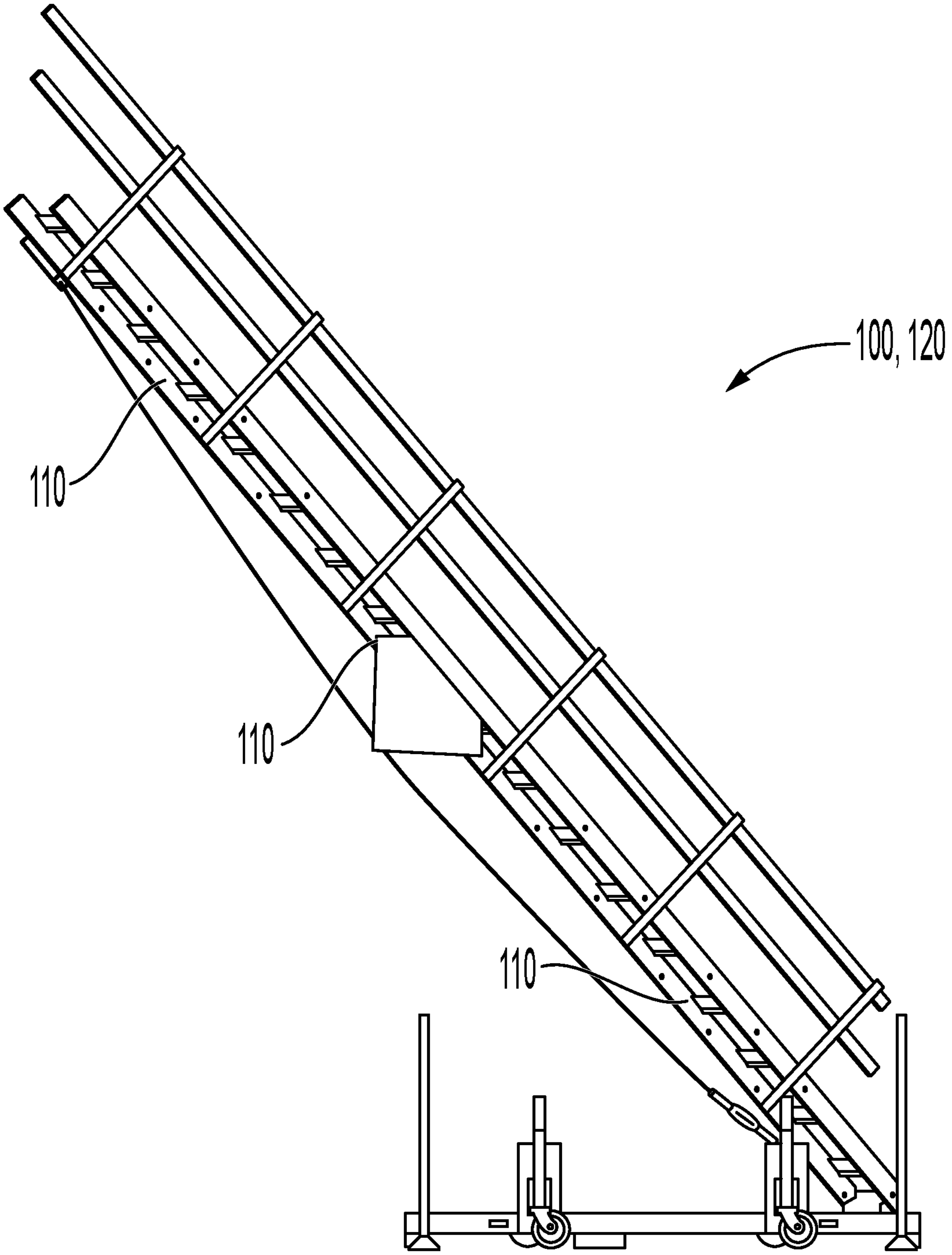
FIG. 4 is a side view of the modular ladder system of FIG. 3 in the assembled configuration.
Figure 5:
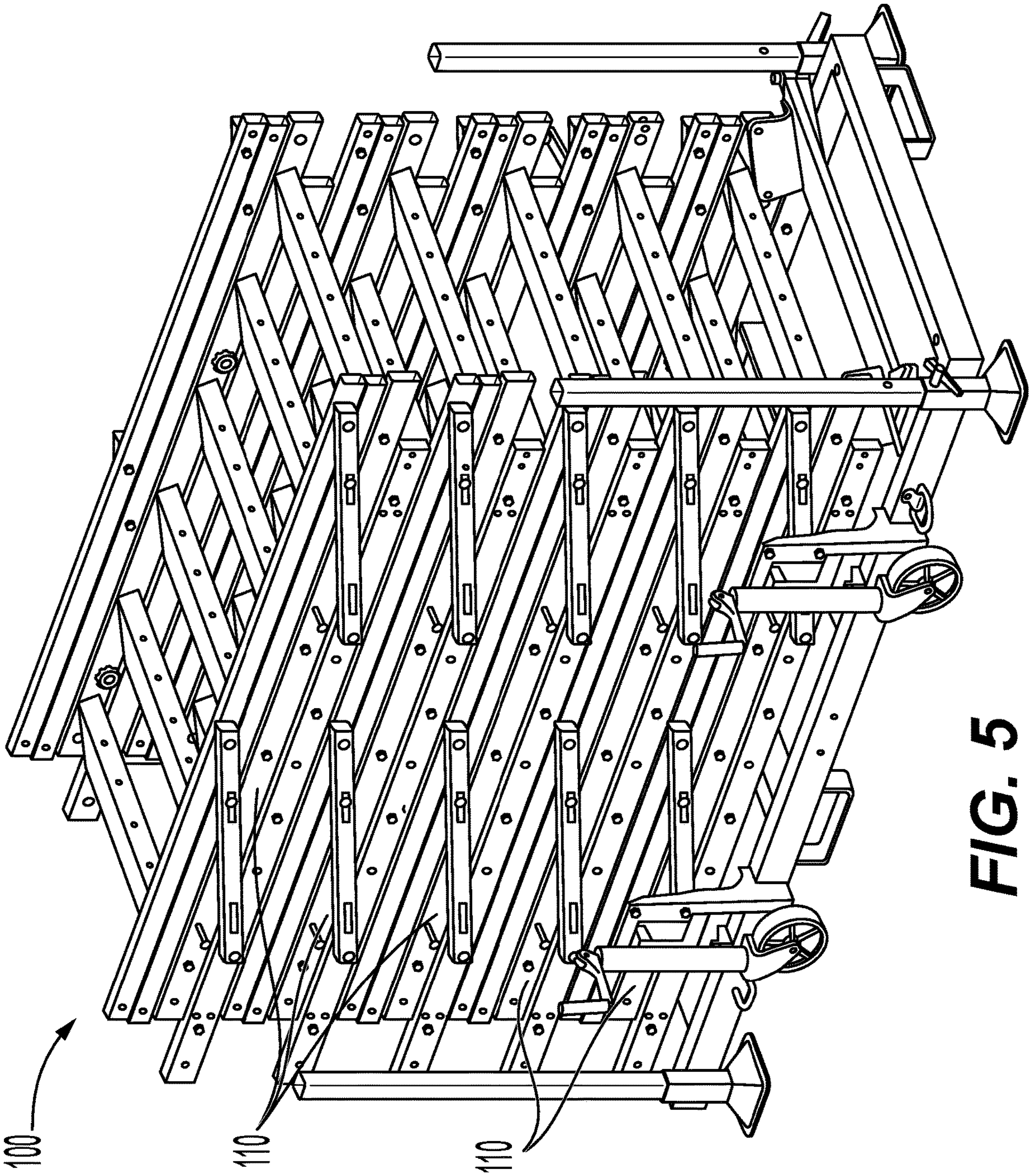
FIG. 5 is a perspective view of the modular ladder system in the unassembled configuration, in accordance with another aspect of the present disclosure.
Figure 6:
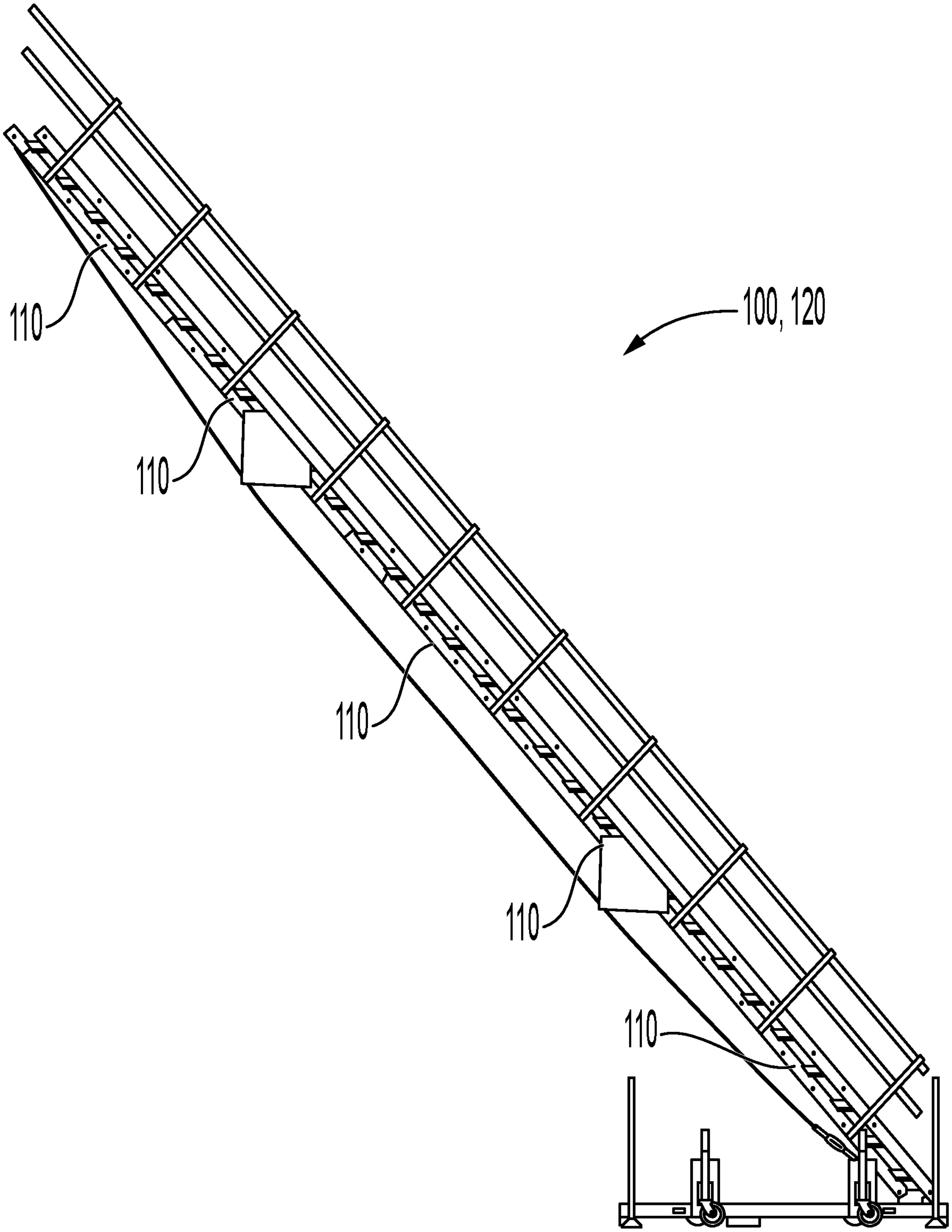
FIG. 6 is a side view of the modular ladder system of FIG. 5 in the assembled configuration.

FIGS. 3 and 4 illustrate the modular ladder system 100 in the unassembled configuration and the assembled configuration, respectively, wherein the modular ladder system 100 comprises three of the ladder modules 110. FIGS. 5 and 6 illustrate the modular ladder system 100 in the unassembled configuration and the assembled configuration, respectively, wherein the modular ladder system 100 comprises five of the ladder modules 110.

Figure 7:
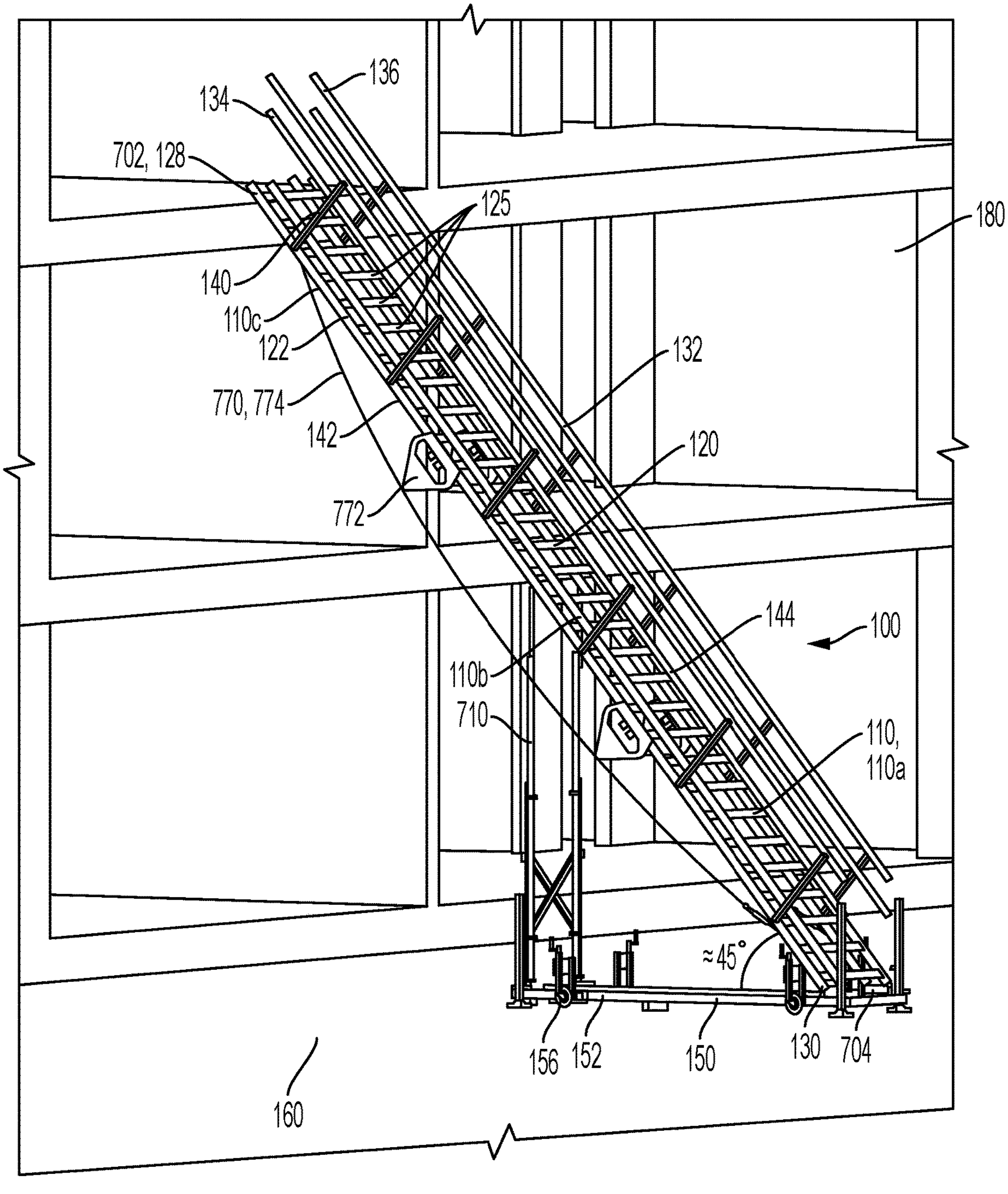
FIG. 7 is a perspective view of the modular ladder system in the assembled configuration, in accordance with another aspect of the present disclosure.

FIG. 7 is a perspective view of the modular ladder system 100, in accordance with another aspect of the present disclosure. The modular ladder system 100 can be used to reach portions of the elevated structure 180, as previously described. In the present view, the modular ladder system 100 is in the assembled configuration. The modular ladder system 100 can comprise one or more of the ladder modules 110 and the ladder base 150. For example, in the present aspect, the modular ladder system 100 can comprise the first, second, and third ladder modules 110*a,b,c*. Other aspects of the modular ladder system 100 can comprise more or fewer ladder modules 110. In the assembled configuration of the modular ladder system 100, the plurality of ladder modules 110 can be assembled to define the ladder 120, as shown. The ladder base 150 can be configured to rest on the ground surface 160, and the ladder 120 can extend generally upward therefrom. In the present aspect, the ladder 120 can be oriented at an acute angle relative to horizontal, such as, for example, at about 45°. However, in other aspects, the ladder 120 can be oriented any other suitable angle.

Example aspects of the ladder 120 can comprise the step portion 122 and the upper support portion 132 supported above the step portion 122. The ladder steps 125 of the step portion 122 can be oriented about horizontally in the assembled configuration. A user can step on the ladder steps 125 as they ascend or descend the ladder 120. The guard rails 134 of the upper support portion 132 can be about parallel to the hand rails 136 of the upper support portion 132. The guard rails 134 and the hand rails 136 can be supported over the step portion 122 by the linkages 140. Each of the guard rails 134 can be disposed between the step portion 122 and the corresponding hand rail 136. The guard rails 134 and the hand rails 136 can provide lateral support to a user as they ascend and descend the ladder 120 to prevent the user from falling over the first ladder side 142 and/or the second ladder side 144. The hand rails 136 can provide stable gripping locations at both the first and second ladder sides 142, 144 for a user to grip as they ascend and descend the ladder 120.

The ladder 120 can define an elevated first ladder end 702 engaging the elevated structure 180 and an opposite second ladder end 704 coupled to the ladder base 150. The ladder base 150 can be configured to rest on and support the ladder 120 above the ground surface 160. Example aspects of the ladder base 150 can comprise the base frame 152. The lower end 130 of the step portion 122 can engage the base frame 152 to affix the ladder 120 thereto, and the upper end 128 of the step portion 122 opposite the lower end 130 can engage the elevated structure 180. According to example aspects, each of the ladder modules 110 can first be assembled together to define the ladder 120, and the first ladder end 702 can then be raised to orient the ladder 120 at the desired angle and elevation.

A cable tensioning system 770 can be provided for tensioning the ladder 120 in the assembled configuration. The cable tensioning system 770 can comprise at least one truss assembly 772 and at least one tensioning cable 774. In example aspects, the ladder base 150 can further comprise a base support assembly 710 configured to support the raised ladder 120 over the ladder base 150. The ladder base 150 can be configured to roll, slide, glide, or otherwise move along the ground surface 160 to transport the modular ladder system 100 and/or to position the modular ladder system 100 at a desired location relative to the elevated structure 180. For example, in the present aspect, the ladder base 150 can comprise a plurality of the wheel assemblies 156 configured to roll the ladder base 150 along the ground surface 160.

Figure 8:
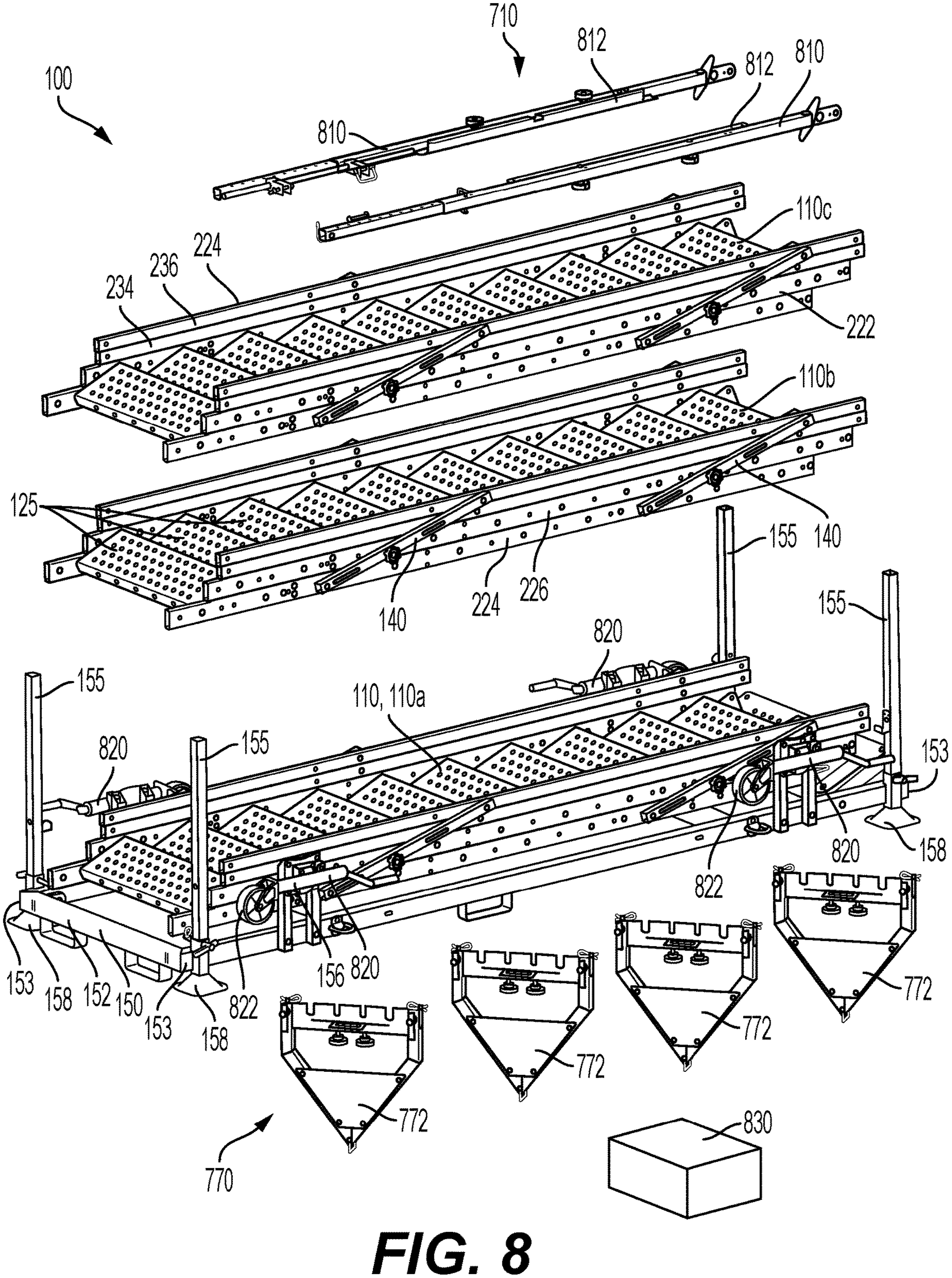
FIG. 8 is an exploded view of the modular ladder system of FIG. 7 in the unassembled configuration.
Figure 9:
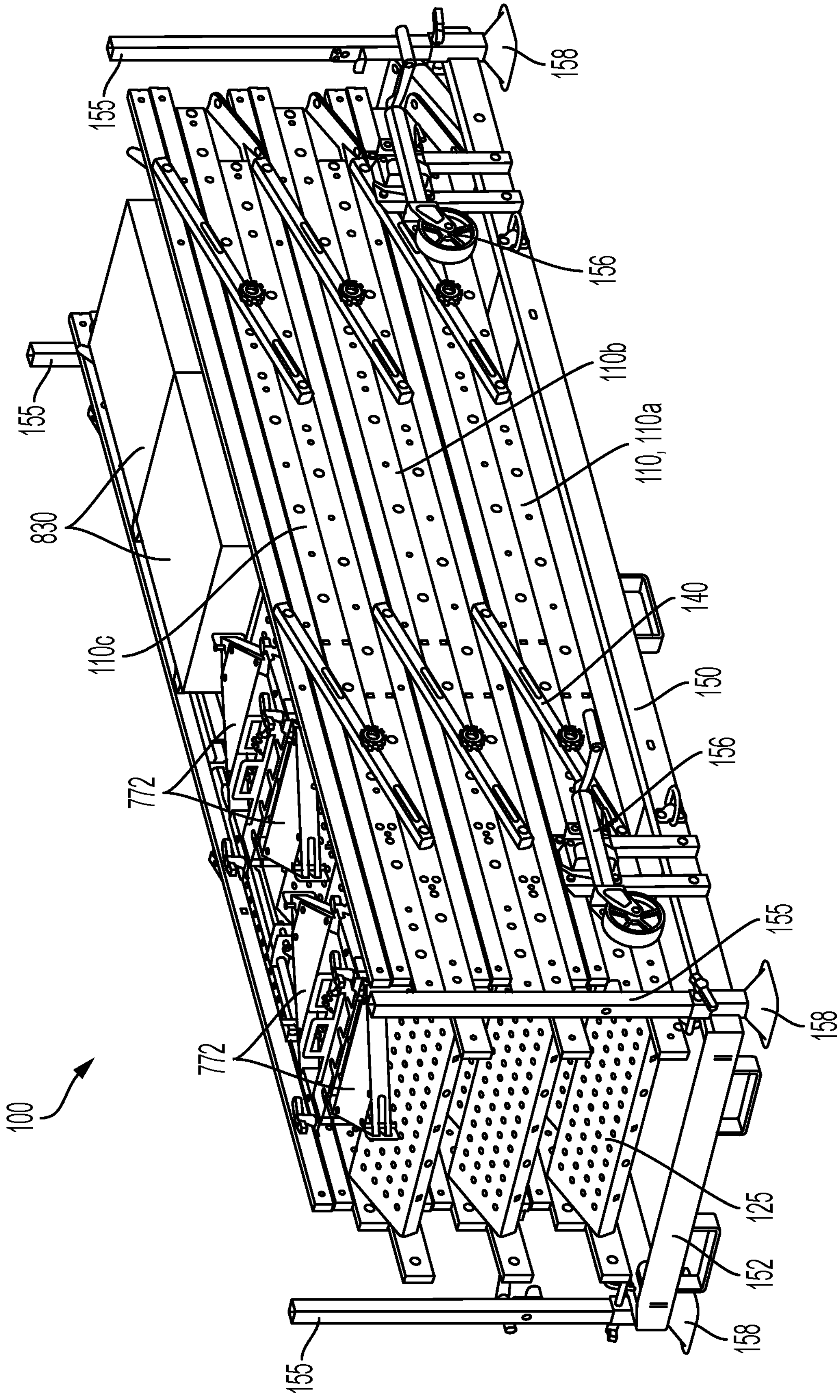
FIG. 9 is a perspective view of the modular ladder system of FIG. 7 in the unassembled configuration.

FIG. 8 illustrates an exploded view of the modular ladder system 100 in the unassembled configuration, and FIG. 9 illustrates a perspective view of the modular ladder system 100 in the unassembled configuration. In the unassembled configuration, the modular ladder system 100 can define a compact unit that is easy to transport. As shown, the modular ladder system 100 comprises that ladder base 150 and the plurality of ladder modules 110 supported thereon. For example, in the present aspect, the plurality of ladder modules 110 can comprise the first, second, and third ladder modules 110*a,b,c*. Each of the ladder modules 110 can be disposed in a substantially horizontal orientation in the unassembled configuration.

In example aspects, each of the ladder modules 110 can comprise the first step rail segments 224, the second step rail segments 226, and the ladder steps 125, as previously described. Each of the ladder steps 125 of the ladder module 110 can extend between the first step rail segments 224 and the second step rail segments 226. Each of the ladder modules 110 can further comprise the hand rail segments 236 and the guard rail segments 234, as previously described. At each of the first module side 242 and the second module side 244, the corresponding segments 224, 226, 324, 326 can be coupled together by the linkages 140. Each of the segments 224, 226, 324, 326 can be pivotably coupled to the corresponding linkage 140. In the collapsed configuration of each ladder module 110, each of the segments 224, 226, 324, 326 can be pivoted inward towards one another at the corresponding linkage 140 to substantially stack on top of one another, as shown. In the expanded configuration, shown in FIG. 7, the linkages 140 can allow the segments 224, 226, 324, 326 to pivot outward to vertically offset the segments 224, 226, 324, 326 from one another.

In example aspects, in the unassembled configuration, each of the independent ladder modules 110 can be stacked vertically on top of one another and can be supported on the ladder base 150 for easy transportation of the unassembled modular ladder system 100. The ladder base can comprise the base frame 152, the vertical base posts 155, and the base support assembly 710. The substantially vertical base posts 155 can extend substantially upward from some or all of the corners 153 of the base frame 152. The base support assembly 710 can comprise one or more support braces 810 and one or more cross members 812 configured to support the ladder 120 (shown in FIG. 7) over the ladder base 150. In some aspects, the support braces 810 can be telescoping braces 810 that can accommodate supporting the ladder 120 at varying angles/elevations. Moreover, in some aspects, the ladder base 150 can comprise the step platform 154 (shown in FIG. 1) that can allow a user to step on to or off of the ladder base 150 when ascending or descending the ladder 120.

Example aspects of the ladder base 150 can also comprise one or more of the wheel assemblies 156. Each of the wheel assemblies 156 can comprise a wheel jack 820 and at least one base wheel 822 coupled to the wheel jack 820. The base wheel 822 can be configured to roll the ladder base 150 along the ground surface 160 (shown in FIG. 7). In some aspects, the base wheels 822 of the wheel assemblies 156 can be disengaged from the ground surface 160 once the modular ladder system 100 is positioned at a desired location, and the engagement feet 158 of the ladder base 150 can contact the ground surface 160 to support the ladder base 150 thereon. Other aspects may not comprise the engagement feet 158, and the ladder base 150 can be configured to rest directly on the ground surface 160 when the wheel assemblies 156 are disengaged. In some aspects, the wheel assemblies 156 can comprise a braking system that can be employed to selectively arrest movement of the ladder base 150 on the ground surface 160.

The modular ladder system 100 can also comprise the cable tensioning system 770 configured to tension the ladder 120 in the assembled configuration. In example aspects, the cable tensioning system 770 can comprise at least one of the tensioning cables 774 (shown in FIG. 7) and at least one of the truss assemblies 772. Additionally, various hardware components can be provided with the modular ladder system 100, which, in the present aspect, can be contained within one or more hardware boxes 830 in the unassembled configuration.

To reconfigure the modular ladder system 100 from the unassembled configuration to the assembled configuration, each of the independent ladder modules 110 can be connected together in series to define the ladder 120, as previously described and as described in additional detail below. More of the ladder modules 110 can be assembled together to construct a longer ladder 120, while fewer of the ladder modules 110 can be assembled together to construct a shorter ladder 120.

Figure 10:
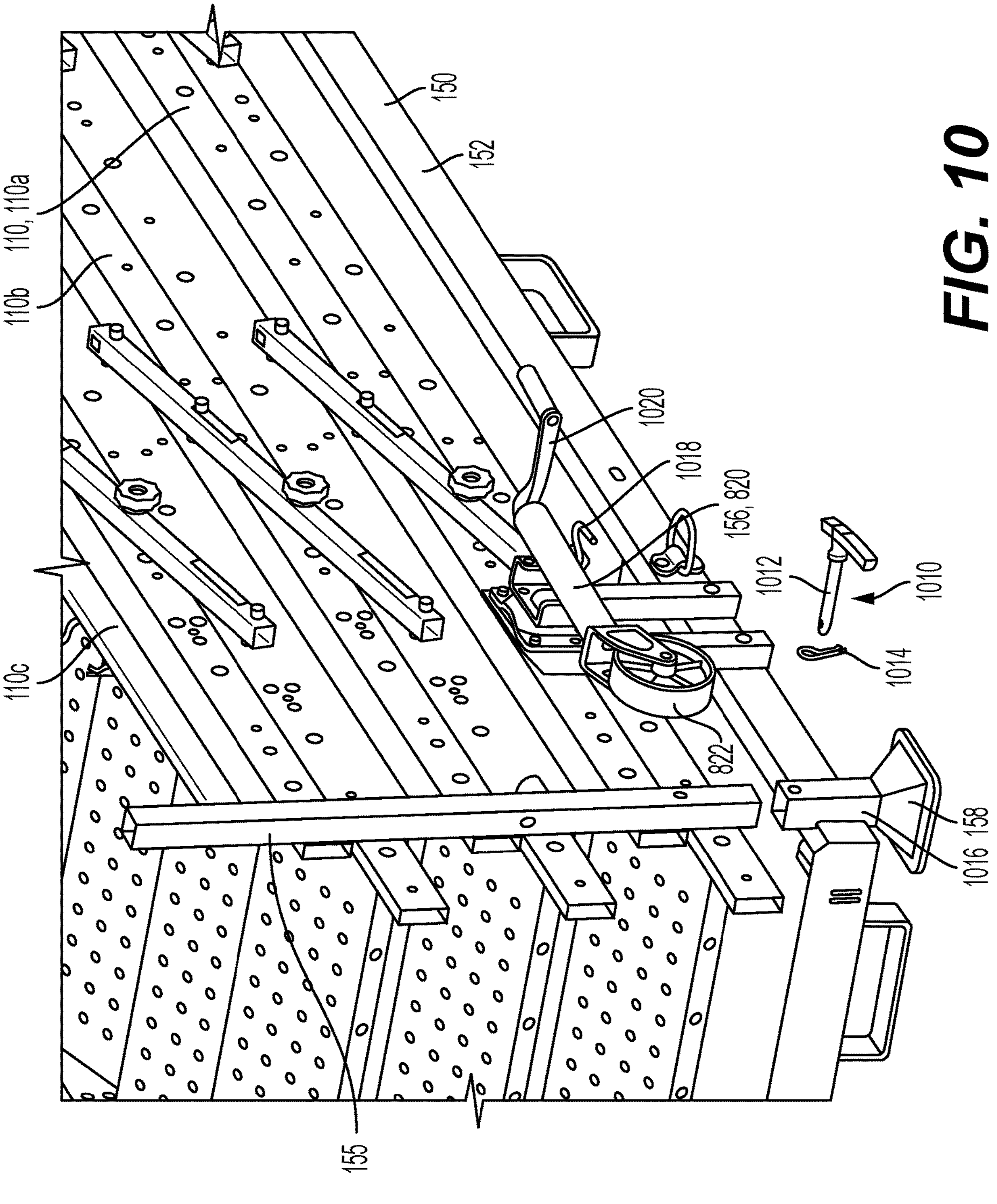
FIG. 10 illustrates a first step in assembling the modular ladder system of FIG. 7.

FIG. 10 illustrates a first example step in assembling the modular ladder assembly 100 (shown in FIG. 7). Each of the substantially vertical base posts 155 can be removably coupled to the base frame 152 by a post fastener 1010. More specifically, in the present aspect, each of the substantially vertical base posts 155 can removably engage an engagement tube 1016 of the base frame 152. In some aspects, each of the engagement feet 158 of the ladder base 150 can extend from a corresponding one of the engagement tubes 1016, as shown. In example aspects, the post fastener 1010 can comprise a pull pin 1012 and a cotter pin 1014. Each of the post fasteners 1010 can be removed from the ladder base 150 to detach each of the substantially vertical base posts 155 from the base frame 152. In other aspects, the post fasteners 1010 can comprise any other suitable fastener or fastening technique known in the art.

Each of the ladder modules 110 (except for a bottom one of the ladder modules 110 stacked directly on the ladder base 150) can then be lifted away from the ladder base 150 and placed on the surrounding ground surface 160 (shown in FIG. 7). In the present aspect, the bottom one of the ladder modules 110 can be the first ladder module **110*a*. Example aspects of the first ladder module 110*a* can be secured to the ladder base 150, such that the first ladder module 110*a* need not be removed therefrom. For example, in some aspects, the first ladder module 110*a* can be pivotably coupled to the ladder base 150 at or near a rear base end 1130 (shown in FIG. 11**) thereof.

In example aspects, as shown, the wheel assemblies 156 can be disengaged from the ground surface 160 while performing the assembly steps of FIG. 9. The wheel assemblies 156 can then be engaged with the ground surface 156 to allow the ladder base 150 (and the first ladder module **110*a* mounted thereon) to be rolled to a desired location. To engage each of the wheel assemblies 156 with the ground surface 160, a wheel pivot pin 1018 can be pulled outward from the corresponding wheel assembly 156, which can allow the wheel jack 820 and the base wheel 822 to pivot towards the ground surface 160 and to contact the base wheel 822 with the ground surface 160. For example, the wheel jack 820 and the base wheel 822 can pivot about 90° relative to the ground surface 160. The wheel pivot pin 1018 can then be released to re-engage the wheel assembly 156 and lock the wheel assembly 156 in the engaged position. Example aspects of the wheel jack 820 can comprise a crank arm 1020**, as described in further detail below.

Figure 11:
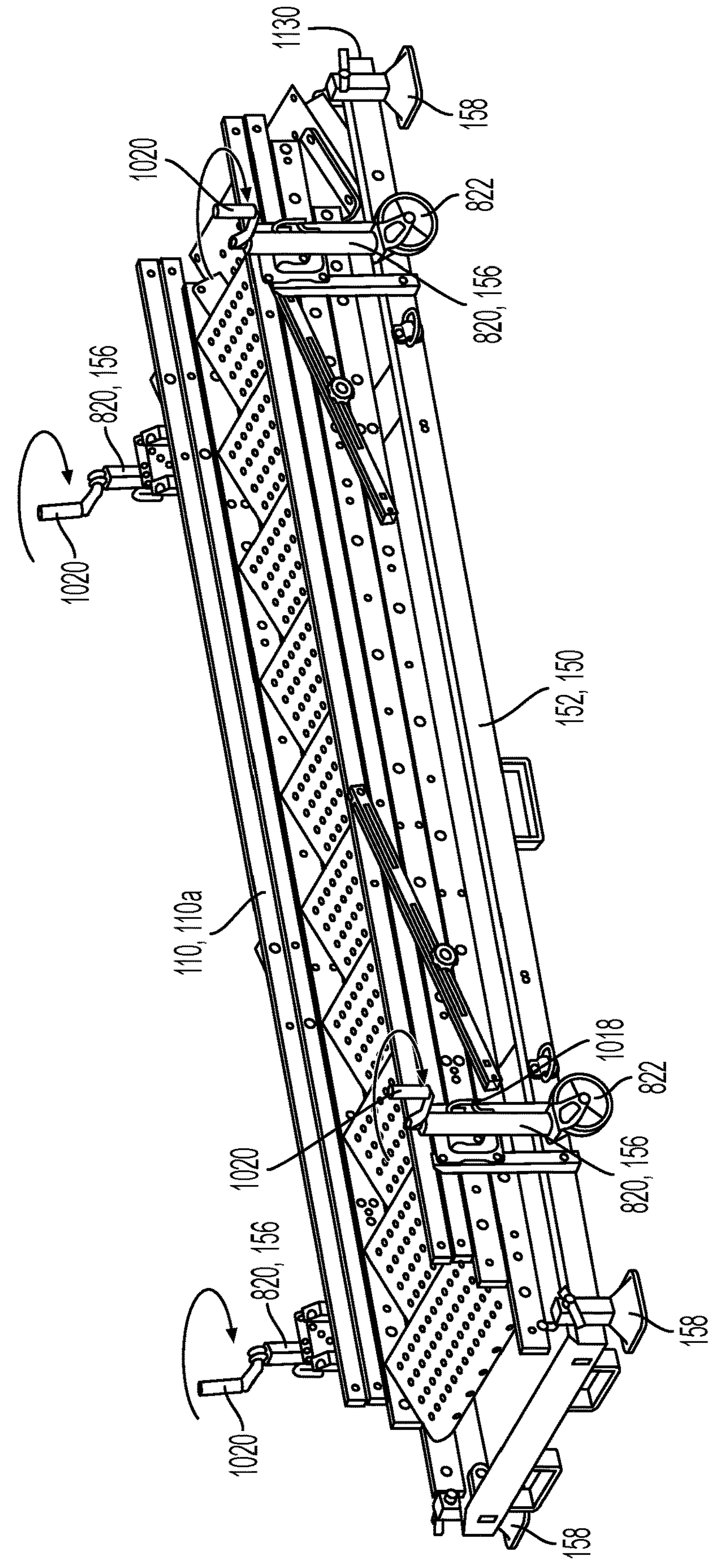
FIG. 11 illustrates a second step in assembling the modular ladder system of FIG. 7.

Referring to FIG. 11, the wheel jack 820 of each wheel assembly 156 can comprise one of the crank arms 1020. With each of the base wheels 822 now in contact with the ground surface 160, the crank arm 1020 can be rotated as indicated by the directional arrows to jack the base frame 152 upward and to disengage the engagement feet 158 from the ground surface 160. The ladder base 150 (and the first ladder module **110*a* mounted thereon) can then be free to roll across the ground surface 160 on the base wheels 822. To later disengage the wheel assemblies 156 from the ground surface 160, these steps can be performed in reverse. That is, the crank arm 1020 can be rotated in reverse to lower the base frame 152 and to re-engage the engagement feet 158 with the ground surface 160, the wheel pivot pin 1018 can be pulled outward from the corresponding wheel assembly 156 to allow the wheel jack 820 and the base wheel 822 to pivot away from the ground surface 160, and the wheel pivot pin 1018 can then be released to lock the wheel assembly 156** in the disengaged position.

Figure 12:
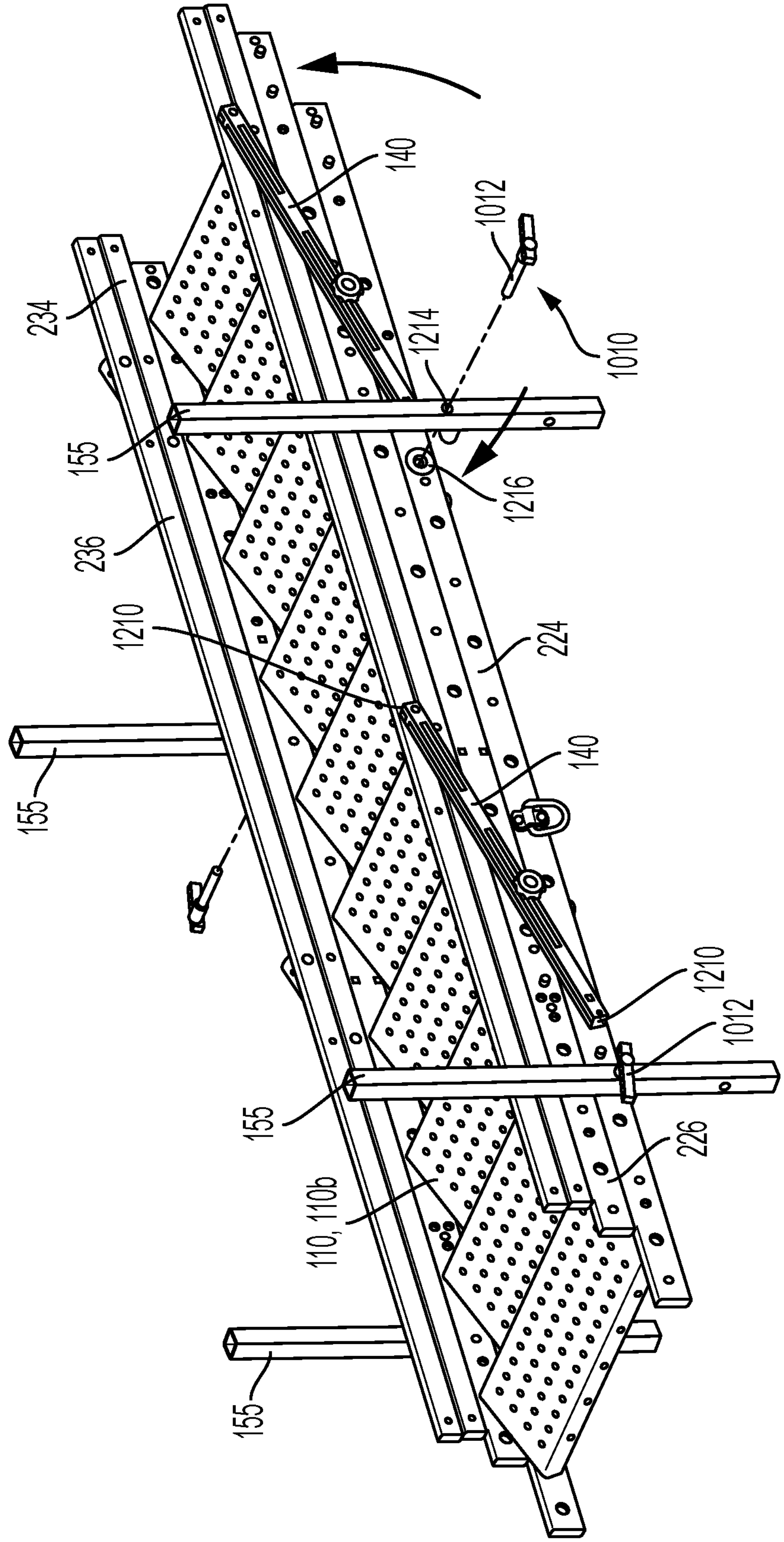
FIG. 12 illustrates a third step in assembling the modular ladder system of FIG. 7.

FIG. 12 illustrates a next example step in assembling the modular ladder assembly 100 (shown in FIG. 7). As shown, a first linkage end 1210 of each linkage 140 can be pivotably coupled to a corresponding one of the first step rail segments 224, and an opposite second linkage end 1212 of each linkage 140 can be pivotably coupled to a corresponding one of the hand rail segments 236. Each of the linkages 140 can further be pivotably coupled to the corresponding second step rail segment 226 and guard rail segment 234 between the first linkage end 1210 and the second linkage end 1212.

Each of the substantially vertical base posts 155 can define a post pin hole 1214 therethrough. Additionally, the second ladder module **110*b* can define a plurality of module pin holes 1216. In example aspects, each of the module pin holes 1216 can be formed through one of the first step rail segments 224 adjacent to the first linkage end 1210 of a corresponding one of the linkages 140. Each of module pin holes 1216 of the second ladder module 110*b* can be aligned with one of the post pin holes 1214 of a corresponding base post 155. The pull pin 1012 of each post fastener 1010 can be inserted through an aligned pair of the post pin holes 1214 and module pin holes 1216 to mount the second ladder module 110*b* to the base posts 155. In some aspects, the cotter pin 1014 (shown in FIG. 10) of each post fastener 1010 can be used to secure the pull pins 1012 in position. When mounted to the base posts 155, the second ladder module 110*b* can be elevated above the ground surface 160 (shown in FIG. 7**), as shown.

Figure 13:
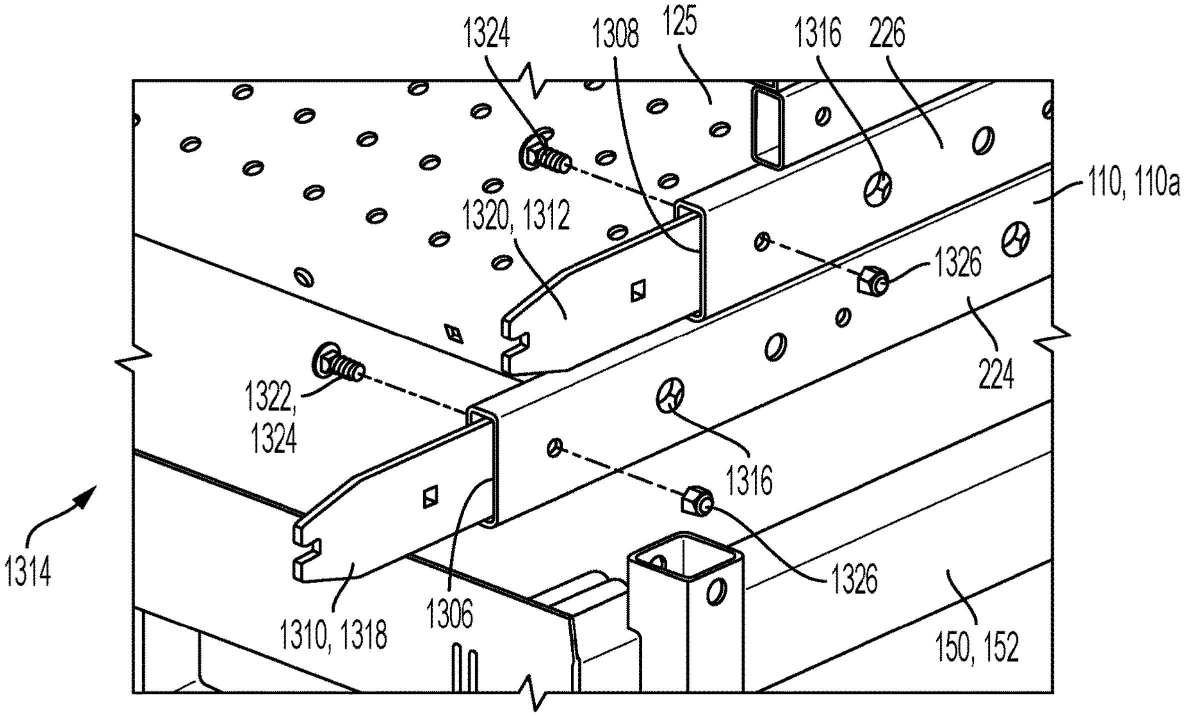
FIG. 13 illustrates a fourth step in assembling the modular ladder system of FIG. 7.

FIG. 13 illustrates a next example step is assembling the modular ladder assembly 100 (shown in FIG. 7). The first ladder module **110*a* is shown mounted on the ladder base 150. In example aspects, each of the first step rail segments 224 can be formed as a rail tube defining an open first front end 1306, and each of the second step rail segments 226 can be formed as a rail tube defining an open second front end 1308. As shown, a first splice plate 1310 can be inserted into the open first front end 1306 of each of the first step rail segments 224 of the first ladder module 110*a*. Similarly, a second splice plate 1312 can be inserted into the open second front end 1308 of each of the second step rail segments 226 of the first ladder module 110*a*. Each of the first front ends 1306 and the second front ends 1308 can be disposed at a front module end 1314 of the first ladder module 110*a*. The ladder base 150 can be oriented to face the front module end 1314 towards the elevated structure 180 (shown in FIG. 7**).

In some example aspects, each of the ladder steps 125 can be secured to the corresponding first step rail segments 224 and second step rail segments 226 by step carriage bolts 1316, as shown. Each of the first splice plates 1310 and second splice plate 1312 can be configured to stop against (and in some aspects, nest with) a corresponding front one of the step carriage bolts 1316. When stopped against the step carriage bolts 1316, a first exposed portion 1318 of each first splice plate 1310 can extend forward beyond the open first front end 1306 of the corresponding first step rail segment 224, and a second exposed portion 1320 of each second splice plates 1312 can extend forward beyond the open second front end 1308 of the corresponding second step rail segment 226. Each of the first and second splice plates 1310, 1312 can further be secured to the corresponding first and second step rail segments 224, 226, respectively, by a splice fastener 1322. In the present aspect, each of the splice fastener 1322 can comprise a splice carriage bolt 1324 and a nyloc nut 1326. However, in other aspects, the splice fastener 1322 can comprise any other suitable fastener or fastening technique known in the art.

Figure 14:
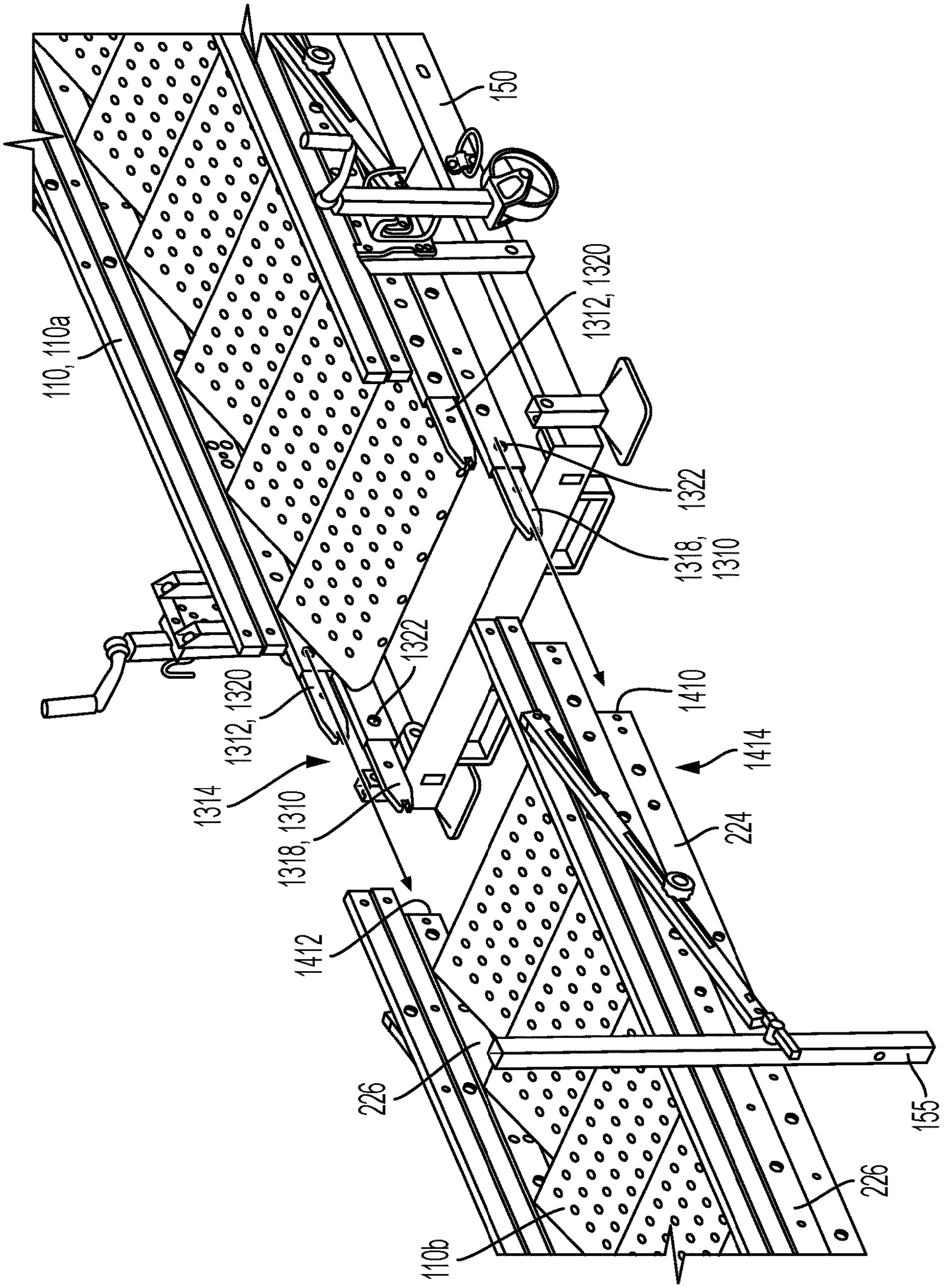
FIG. 14 illustrates a fifth step in assembling the modular ladder system of FIG. 7.

FIG. 14 illustrates a next example step in assembling the modular ladder system 100 (shown in FIG. 7). The second ladder module 110*b* can now be attached to the first ladder module 110*a*. In example aspects, the second ladder module 110*b* supported by the substantially vertical base posts 155 can be substantially laterally aligned (e.g., aligned at substantially the same elevation) with the first ladder module 110*a* supported by the ladder base 150. The first exposed portion 1318 of each of the first splice plates 1310 of the first ladder module 110*a* can be inserted into an open first rear end 1410 of a corresponding one of the first step rail segments 224 of the second ladder module 110*b* Similarly, the second exposed portion 1320 of each of the second splice plates 1312 of the first ladder module 110*a* can be inserted into an open second rear end 1412 of a corresponding one of the second step rail segments 226 of the second ladder module 110*b*. Each of the first rear ends 1410 and the second rear ends 1412 can be disposed at a rear module end 1414 of the second ladder module 110*b*, which can face away from the elevated structure 180 (shown in FIG. 7) in the present orientation. The first splice plates 1310 and second splice plates 1312 can then be secured to the second ladder module 110*b* by additional ones of the splice fasteners 1322 in the same manner as secured to the first ladder module 110*a*.

Figure 15:
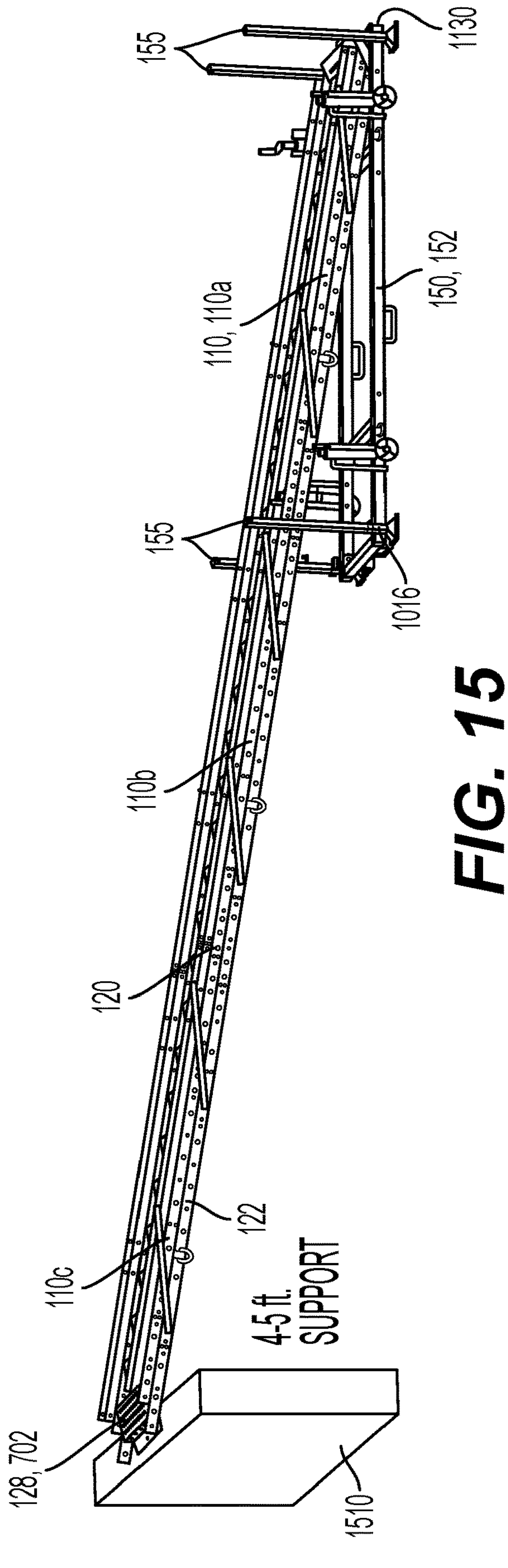
FIG. 15 illustrates a sixth step in assembling the modular ladder system of FIG. 7.

Referring to FIG. 15, in some aspects, the modular ladder system 100 can further comprise the third ladder module 110*c*. The third ladder module 110*c* can be affixed to the second ladder module 110*b* in the same manner that the second ladder module 110*b* is affixed to the first ladder module 110*a*, as previously described. In the present aspect, the first, second, and third ladder modules 110*a,b,c* can together define the ladder 120. The base posts 155 can now be reattached to the corresponding engagement tubes 1016 of the ladder base 150 with the post fasteners 1010 (shown in FIG. 10).

The ladder 120 can then be angled slighted upward from the ladder base 150 (for example, by lifting manually) to rest the first ladder end 702 of the ladder 120 on a support element 1510. More, specifically, the upper end 128 of the step portion 122 can be elevated and rested on the support element 1510. In example aspects, the first ladder module 110*a* can be pivotably coupled to the ladder base 150 at or near the rear base end 1130 to allow the ladder 120 to pivot upward from the ladder base 150. The support element 1510 can be a component of the elevated structure 180 (shown in FIG. 7) in some aspects, while in other aspects, the support element 1510 can be separate from the elevated structure 180. The support element 1510 can define a height of about 4-5 feet in the present aspect, though in other aspects, the support element 1510 can define a greater or lesser height. The support element 1510 can be suitably durable to support the load of the ladder 120. For example, in some aspects, the support element 1510 can support about 200 lbs. or more thereon. In other aspects, the support element 1510 may need only to support less than 200 lbs. thereon.

Figure 16:
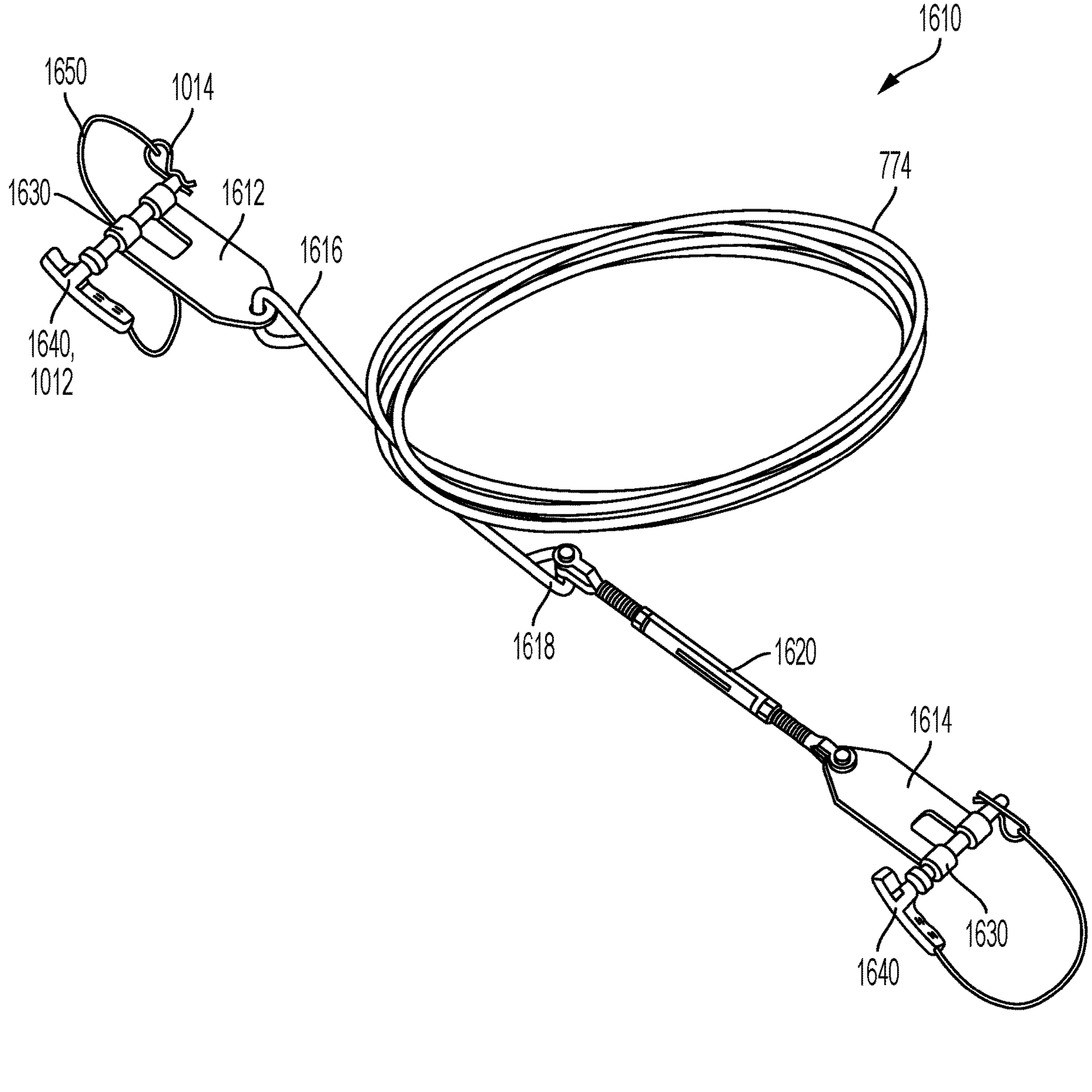
FIG. 16 is a perspective view of a cable assembly of the modular ladder system of FIG. 7.

Referring now to FIG. 16, the cable tensioning system 770 (shown in FIG. 7) can comprise one or more cable assemblies 1610. Each of the cable assemblies 1610 can comprise one of the tensioning cables 774. Each of the cable assemblies 1610 can further comprise a first cable bracket 1612 coupled to a first cable end 1616 of the tensioning cable 774 and a second cable bracket 1614 coupled to a second cable end 1618 of the tensioning cable 774. Each of the cable brackets 1612, 1614 can comprise a bracket fastener 1640. In the present aspect, each bracket fastener 1640 can comprise an additional one of the pull pins 1012 and an additional one of the cotter pins 1014. In some aspects, each cotter pin 1014 can be connected to the corresponding pull pin 1012 by a connecting cord 1650. Moreover, each of the cable brackets 1612, 1614 can define a tubular or hooked bracket end 1630 configured to receive the pull pin 1012. In some aspects, a cable tensioner 1620 for tensioning the tensioning cable 774 can be disposed between the second cable end 1618 and the second cable bracket 1614, as shown.

Figure 17:
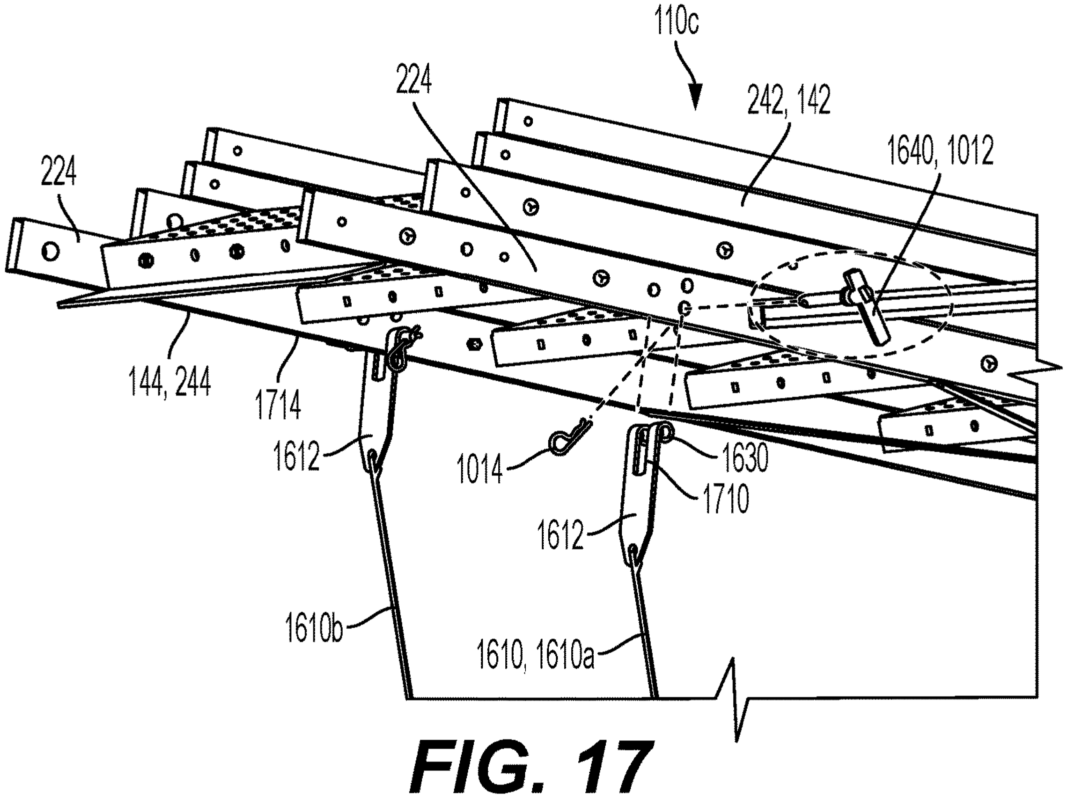
FIG. 17 illustrates a seventh step in assembling the modular ladder system of FIG. 7.

FIG. 17 illustrates a next example step in assembling the modular ladder assembly 100 (shown in FIG. 7). In the present aspect, the cable tensioning system 770 (shown in FIG. 7) can comprise a first one of the cable assemblies 1610*a* and a second one of the cable assemblies 1610*b*. The first cable assembly 1610*a* can be disposed at the first ladder side 142 of the ladder 120, and the second cable assembly 1610*b* can be disposed at the second ladder side 144 of the ladder 130. The first cable bracket 1612 of the first cable assembly 1610*a* can be coupled to the first step rail segment 224 of the third ladder module 110*c* that is oriented at the first module side 242 thereof, and the first cable bracket 1612 of the second cable assembly 1610*b* can be coupled to the first step rail segment 224 of the third ladder module 110*c* that is oriented at the second module side 244 thereof. The first cable brackets 1612 can be secured to the third ladder module 110*c* in the present aspect, but in other aspects, the first cable bracket 1612 can be secured to whichever ladder module 110 is farthest from the ladder base 150 (shown in FIG. 7)

In some aspects, each of the first cable brackets 1612 can define a bracket slot 1710 and the hooked bracket end 1630, as illustrated. Each bracket slot 1710 can be configured to receive a bottom segment side 1714 of the corresponding first step rail segment 224 therein. The bracket fastener 1640 can then engage each of the first step rail segments 224, and each of the hooked bracket ends 1630 can be hooked onto the corresponding bracket fastener 1640. In the present aspect, the bracket fastener 1640 can comprise an additional one of the pull pins 1012 and an additional one of the cotter pins 1014, and the hooked bracket end 1630 can be hooked onto the pull pin 1012. In other aspects, each bracket fastener 1640 can comprise any other suitable type of fastener or fastening technique.

Figure 18:
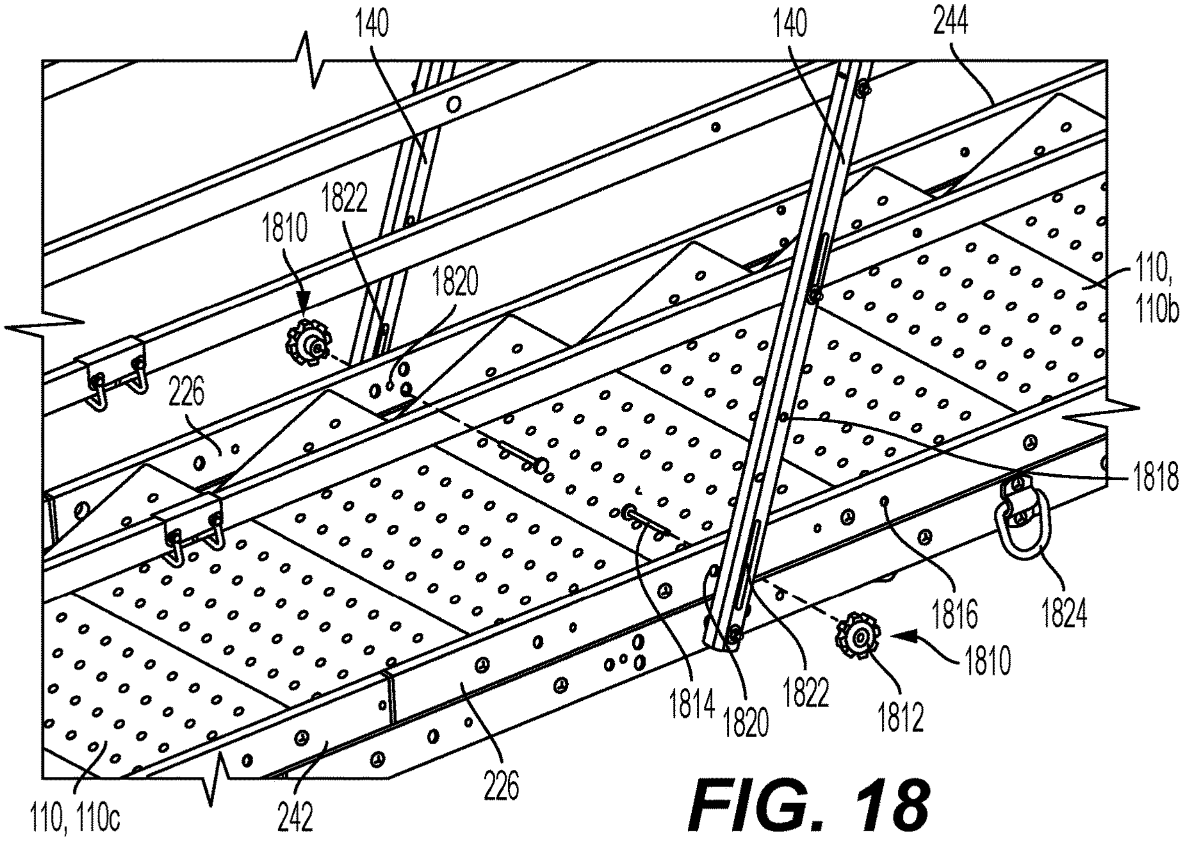
FIG. 18 illustrates an eighth step in assembling the modular ladder system of FIG. 7.

FIG. 18 illustrates a next example step in assembling the modular ladder system 100 (shown in FIG. 7). According to example aspects, each of the linkages 140 can be retained in the collapsed configuration and prevented from pivoting to the expanded configuration by a linkage fastener 1810. In example aspects, the linkage fastener 1810 can comprise a threaded knob 1812 and a linkage carriage bolt 1814. In the collapsed configuration, each linkage carriage bolt 1814 can be received through a first rail opening 1816 in the corresponding second step rail segments 226 and through a first linkage opening or slot 1818 in the corresponding linkage 140 to engage the threaded knob 1812, thereby securing the linkage 140 to the second step rail segment 226 in the collapsed configuration.

Each threaded knob 1812 and linkage carriage bolt 1814 can be removed from the corresponding linkages 140 to detach the linkages 140 from the second step rail segment 226 and allow the linkages 140 to be pivoted to the expanded configuration. Each linkage 140 can then be secured in the expanded configuration by receiving the corresponding linkage carriage bolt 1814 through a second rail opening 1820 in the corresponding second step rail segment 226 and through a second linkage opening or slot 1822 in the corresponding linkage 140 and engaging the linkage carriage bolt 1814 with the corresponding threaded knob 1812. In other aspects, each linkage fastener 1810 can comprise any other suitable type of fastener or fastening technique.

According to example aspects, one or more of the ladder modules 110 can further comprise a hoisting ring 1824 disposed at each of the first module side 242 and the second module side 244. The hoisting rings 1824 can be used in elevating the ladder 120 to engage the elevated structure 180, as described in further detail below with respect to FIG. 24. In the present aspect, each of the ladder modules 110*a,b,c* can comprise the hoisting rings 1824. In example aspects, at least the ladder module 110 that is farthest from the ladder base 150 (shown in FIG. 7), such as the third ladder module 110*c*, can comprise the hoisting rings 1824.

Figure 19:
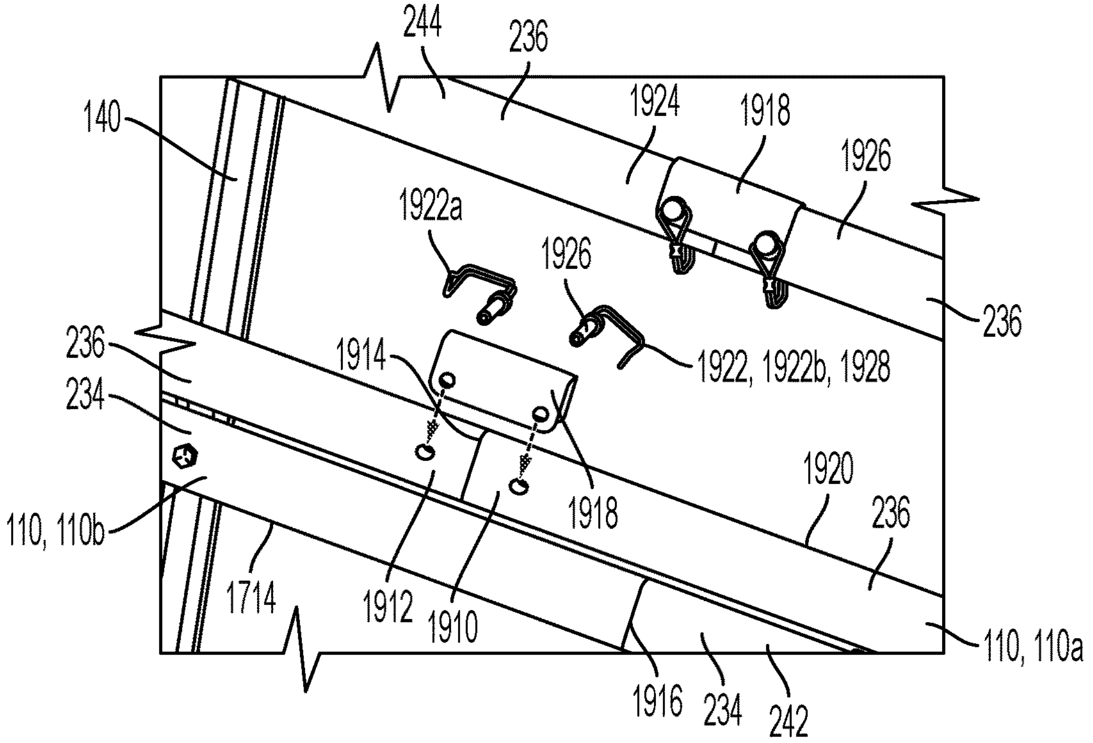
FIG. 19 illustrates a ninth step in assembling the modular ladder system of FIG. 7.

FIG. 19 illustrates a next example step in assembling the modular ladder system 100 (shown in FIG. 7). As previously described, each of the ladder modules 110 can comprise one of the hand rail segments 236 at the first module side 242 thereof and one of the hand rail segments 236 at the second module side 244 thereof. Each of the hand rail segments 236 can define a first hand rail segment end 1910 and a second hand rail segment end 1912 opposite the first hand rail segment end 1910. When the linkages 140 of all of the ladder modules 100 are in the expanded configuration, the first hand rail segment end 1910 of each hand rail segment 236 can confront the second hand rail segment end 1912 of an adjacent hand rail segment 236.

For example, in the present aspect, the first hand rail segment ends 1910 of the hand rail segments 236 of the first ladder module 110*a* can confront the second hand rail segment ends 1912 of the corresponding hand rail segments 236 of the second ladder module 110*b* Similarly, the first hand rail segment ends 1910 of the hand rail segments 236 of the second ladder module 110*b* can confront the second hand rail segment ends 1912 of the corresponding hand rail segments 236 of the third ladder module 110*c* (shown in FIG. 15). A hand rail splice point 1914 can be defined at each of the confronting first hand rail segment ends 1910 and second hand rail segment ends 1912. Similarly, guard rail splice points 1916 can be defined between confronting guard rail segments 234.

In example aspects, splice cuffs 1918 can be provided for reinforcing and at least partially covering each of the hand rail splice points 1914 and the guard rail splice points 1916. Each of the splice cuffs 1918 can be substantially U-shaped and can be configured to slip over a top segment side 1920 or the bottom segment side 1714 of the corresponding hand rail segments 236 and guard rail segments 234. Each of the splice cuffs 1918 can be secured in place over the corresponding hand rail splice point 1914 or guard rail splice point 1916 by one or more cuff fasteners 1922. In the present aspect, each of the cuff fasteners 1922 can be a safety pin 1924 comprising a pin rod 1926 and a flexible pin lock 1928. In other aspects, each cuff fastener 1922 can comprise any other suitable type of fastener or fastening technique. In example aspects, first and second cuff fasteners 1922*a,b* can secure each of the splice cuffs 1918 at the corresponding hand rail splice point 1914 or guard rail splice point 1916. For example, the first cuff fastener 1922*a* can secure the splice cuff 1918 to the hand rail segment 236 or guard rail segment 234 at a first side 1924 of the corresponding splice point 1914, 1916, respectively, and the second cuff fastener 1922*b* can secure the splice cuff 1918 to the confronting hand rail segment 236 or guard rail segment 234 at a second side 1926 of the corresponding splice point.

Figure 20:
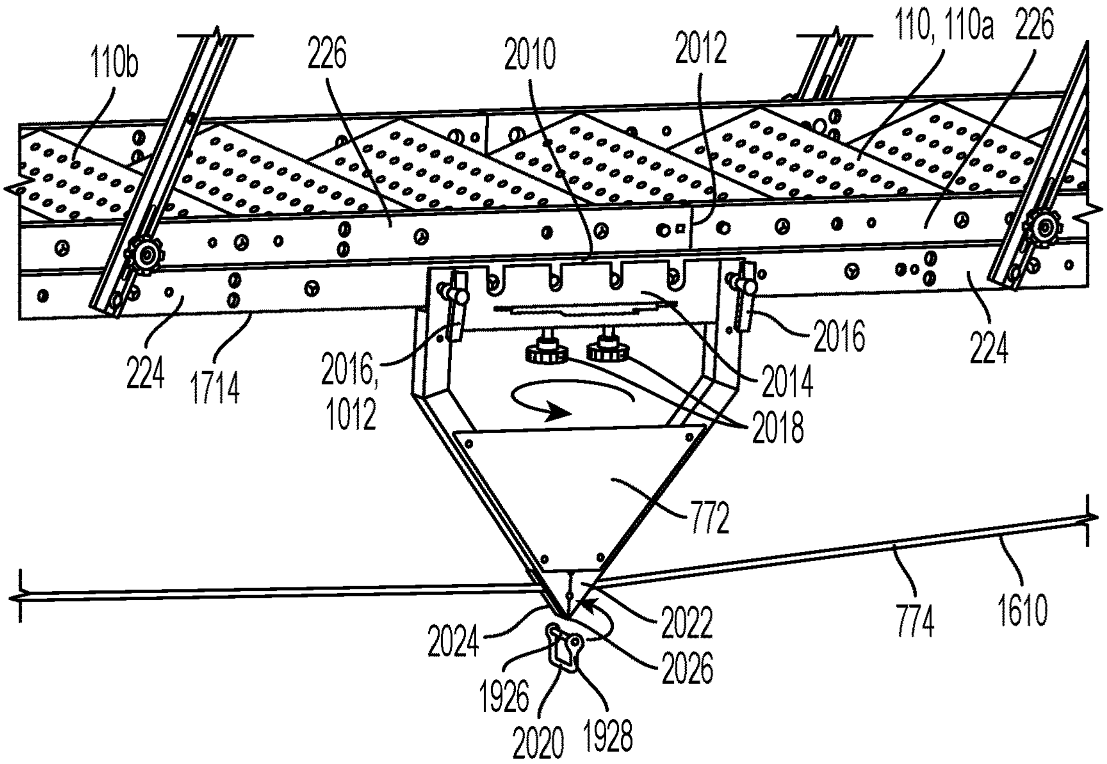
FIG. 20 illustrates a tenth step in assembling the modular ladder system of FIG. 7.

FIG. 20 illustrates a next example step in assembling the modular ladder assembly 100 (shown in FIG. 7). According to example aspects, similar to the hand rail splice points 1914 (shown in FIG. 19) and the guard rail splice points 1916 (shown in FIG. 19), a first rail splice point 2010 can be defined between confronting first step rail segments 224. Additionally, a second rail splice point 2012 can be defined between confronting second step rail segments 226. Each of the truss assemblies 772 can be configured to reinforce and at least partially cover a corresponding one of the first rail splice points 2010, as shown. For example, each of the truss assemblies 772 can comprise a U-shaped upper portion 2014 configured to slip over the bottom segment side 1714 of the corresponding first step rail segments 224 at the first rail splice point 2010.

Truss fasteners 2016 can be provided for securing the truss assemblies 772 to the first step rail segments 224 at the corresponding first rail splice point 2010. In the present aspect, each of the truss fasteners 2016 can comprise an additional one of the pull pins 1012 and an additional one of the cotter pins 1014 (shown in FIG. 10), which can secure each truss assembly 772 to the corresponding first step rail segments 224 at either side of the first rail splice point 2010 as previously described. In other aspects, each truss fastener 2016 can comprise any other suitable type of fastener or fastening technique. Additionally, in example aspects, each of the truss assemblies 772 can comprise a pair of truss tensioning knobs 2018. Each of the truss tensioning knobs 2018 can engage one of the confronting first step rail segments 224 on either side of the corresponding first rail splice point 2010. The truss tensioning knobs 2018 can be rotated to properly tension and align the confronting first step rail segments 224.

According to example aspects, each of the truss assemblies 772 can further comprise a cable fastener 2020 for coupling the corresponding tensioning cable 774 to the truss assembly 772. In the present aspect, each of the cable fasteners 2020 can be another one of the safety pins 1924 comprising the pin rod 1926 and the flexible pin lock 1928. In other aspects, each cable fastener 2020 can comprise any other suitable type of fastener or fastening technique. Example aspects of the truss assembly 772 can comprise a truss front tab 2022 and a truss rear tab 2024. The cable fastener 2020 can extend between the trust front tab 2022 and the truss rear tab 2024 at a truss bottom end 2026 of the truss assembly 772. The cable fastener 2020 can be removed from the truss assembly 772, and the tensioning cable 774 can be inserted between the truss front tab 2022 and the truss rear tab 2024. The cable fastener 2020 can then be reattached to the truss assembly 772 at the truss bottom end 2026 to retain the tensioning cable 774 between the truss front tab 2022 and the truss rear tab 2024.

In a next step, the second cable bracket 1614 (shown in FIG. 16) of each cable assembly 1610 can be coupled to the corresponding first step rail segment 224 of the first ladder module 110*a* in substantially the same manner that the first cable brackets 1612 (shown in FIG. 16) were coupled to the corresponding first step rail segments 224 of the third ladder module 110*c* (shown in FIG. 7).

Figure 21:
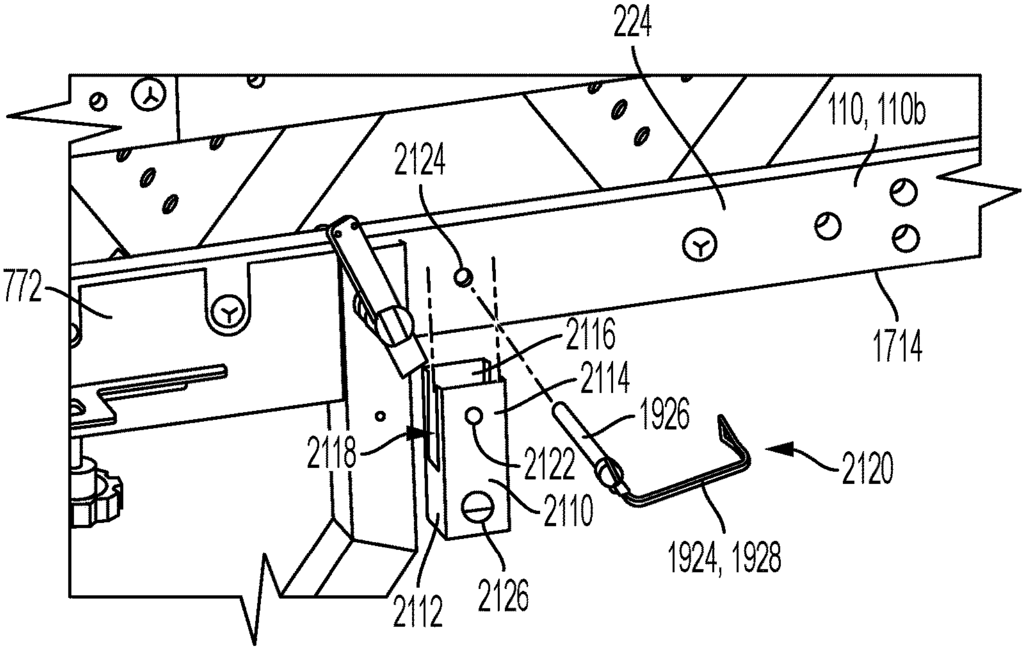
FIG. 21 illustrates an eleventh step in assembling the modular ladder system of FIG. 7.

FIG. 21 illustrates a next example step in assembling the modular ladder system 100 (shown in FIG. 7). The modular ladder system 100 can comprise a pair of support brackets 2110 that can be mounted to a corresponding one of the ladder modules 110. In the present aspect, each of the support brackets 2110 can be coupled to a corresponding one of the first step rail segments 224 of the second ladder module 110*b*. As shown, each of the support brackets 2110 can be coupled to the corresponding first step rail segments 224 of the second ladder module 110*b* adjacent to the truss assembly 772 that reinforces the corresponding first rail splice point 2010 (shown in FIG. 20) between the second ladder module 110*b* and the third ladder module 110*c* (shown in FIG. 7). In other aspects, the support brackets 2110 can be located elsewhere along the first step rail segments 224 and/or on another one of the ladder modules 110. For example, in other aspects, the support brackets 2110 can be coupled to the first ladder module 110*a* (shown in FIG. 7) or the third ladder module 110*c*.

Each of the support brackets 2110 can define a bracket base 2112 and a pair of first and second bracket arms 2114, 2116 extending from the bracket base 2112. A support slot 2118 can be defined between the first and second bracket arms 2114, 2116 and can be configured to receive the bottom segment side 1714 of the corresponding first step rail segment 224 therein. A support fastener 2120 can extend through each of the first and second bracket arms 2114, 2116 and the first step rail segment 224 therebetween to couple the support bracket 2110 to the first step rail segment 224. In example aspects, each of the support fastener 2120 can be another one of the of the safety pins 1924 comprising the pin rod 1926 and the flexible pin lock 1928. In other aspects, each cable fastener 2020 can comprise any other suitable type of fastener or fastening technique. In some aspects, each of the first and second bracket arms 2114, 2116 can define an arm hole 2122 therethrough, the first step rail segment 224 can define a rail hole 2124 therethrough, and the pin rod 1926 of the support fastener 2120 can engage each of the arm holes 2122 and the rail hole 2124 to secure the support bracket 2110 to the first step rail segment 224. According to example aspects, the support bracket 2110 can further define a base opening 2126 extending through the bracket base 2112, as described in further detail below.

Figure 22:
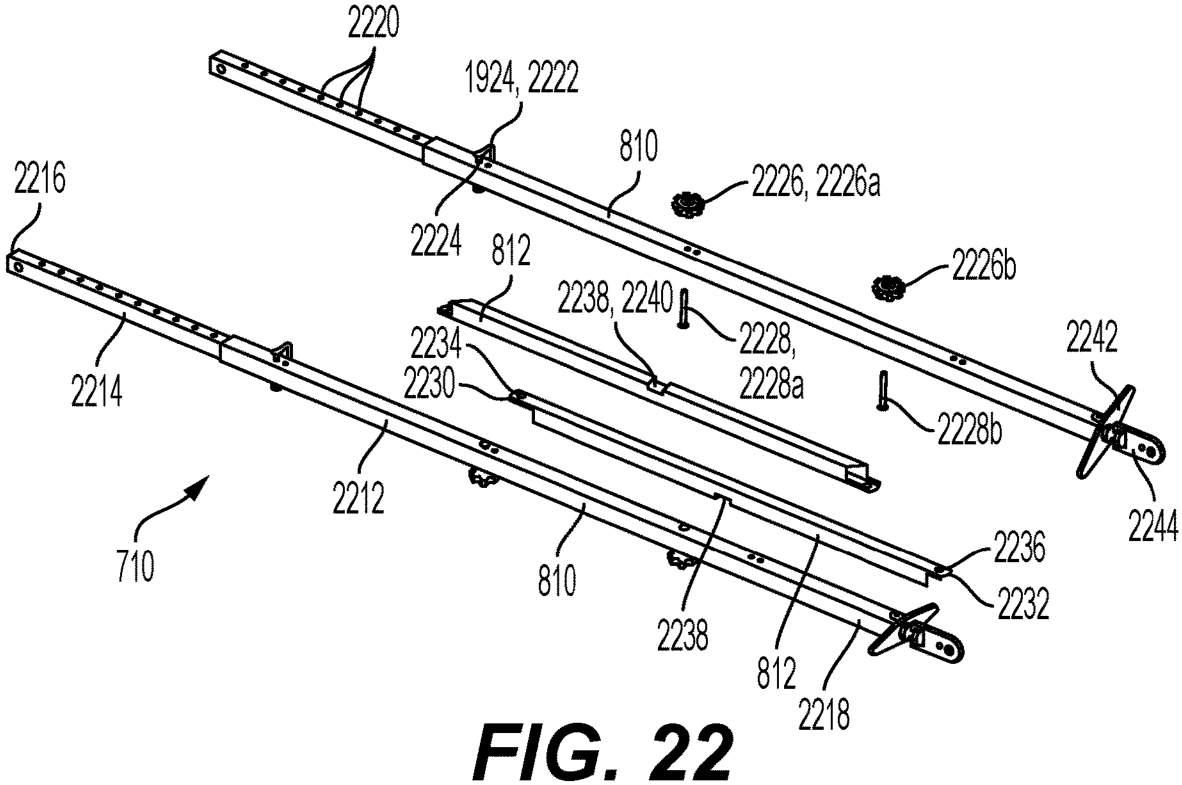
FIG. 22 is an exploded view of a base support assembly of the modular ladder system of FIG. 7.

FIG. 22 illustrates an exploded view of the base support assembly 710 of the modular ladder assembly 100 (shown in FIG. 7), in accordance with an example aspect of the present disclosure. The base support assembly 710 can comprise a pair of the support braces 810 and a pair of the cross members 812. Each of the support braces 810 can comprise an outer brace tube 2212 and an inner brace tube 2214 configured to telescope within the outer brace tube 2212. The inner brace tube 2214 can define a first brace end 2216 of the support brace 810, and the outer brace tube 2212 can define a second brace end 2218 of the support brace 810 opposite the first brace end 2216. A plurality of positioning holes 2220 can be formed through each inner brace tube 2214. The positioning holes 2220 can be spaced apart along a length (or at least partially along a length) of the inner brace tube 2214.

Each of the support braces 810 can comprise a positioning fastener 2222 for selectively securing the inner brace tube 2214 to the outer brace tube 2212 in varying positions. In example aspects, the positioning fastener 2222 can be another one of the safety pins 1924 comprising the pin rod 1926 (shown in FIG. 19) and the flexible pin lock 1928 (shown in FIG. 19). Each of the outer brace tubes 2212 can comprise a locking hole 2224. Each inner brace tube 2214 can be telescoped within the corresponding outer brace tube 2212 to adjust a length of the support brace 810. The locking hole 2224 in the outer brace tube 2212 can be aligned with a corresponding one of the positioning holes 2220 in the inner brace tube 2214 at a desired length of the support brace 810. The positioning fastener 2222 can engage the locking hole 2224 and the corresponding aligned positioning hole 2220 to secure the inner brace tube 2214 in position relative to the outer brace tube 2212 at the desired length.

Each of the support braces 810 can comprise one or more brace tensioning knobs 2226 coupled thereto by a tensioning carriage bolt 2228. For example, in the present aspect, each of the support braces 810 can define a first brace tensioning knob 2226*a* and a corresponding first tensioning carriage bolt 2228*a*, as well as a second brace tensioning knob 2226*b* and a corresponding second tensioning carriage bolt 2228*b*. Each of the cross members 812 can define a first member end 2230 and a second member end 2232 opposite the first member end 2230. A first coupling tab 2234 can be defined at each of the first member ends 2230, and a second coupling tab 2236 can be defined at each of the second member ends 2232. In example aspects, the first member end 2230 of each cross member 812 can be coupled to a corresponding one of the support braces 810 by the first brace tensioning knob 2226*a* and the first tensioning carriage bolt 2228*a*. Similarly, the second member end 2232 of each cross member 812 can be coupled to a corresponding one of the support braces 810 by the second brace tensioning knob 2226*b* and the second tensioning carriage bolt 2228*b*. Each of the cross members 812 can further define a nesting notch 2238 at about a midpoint 2240 between the first member end 2230 and the second member end 2232.

Each of the brace tensioning knobs 2226 can be rotated to tension the cross members 812 with the outer brace tubes 2212, as needed, as described below with respect to FIG. 28. Additionally, a tensioning plate 2242 can be rotatably coupled to each of the outer brace tubes 2212 at the second brace end 2218 thereof for further tensioning the support braces 810. In example aspects, a brace mounting tab 2244 can extend (an in some instances can loosely hang) from each of the tensioning plates 2242, as shown. The brace mounting tab 2244 can be configured to couple the support brace 810 to the ladder base 150 (shown in FIG. 7), as described in further detail below with respect to FIG. 26.

Figure 23:
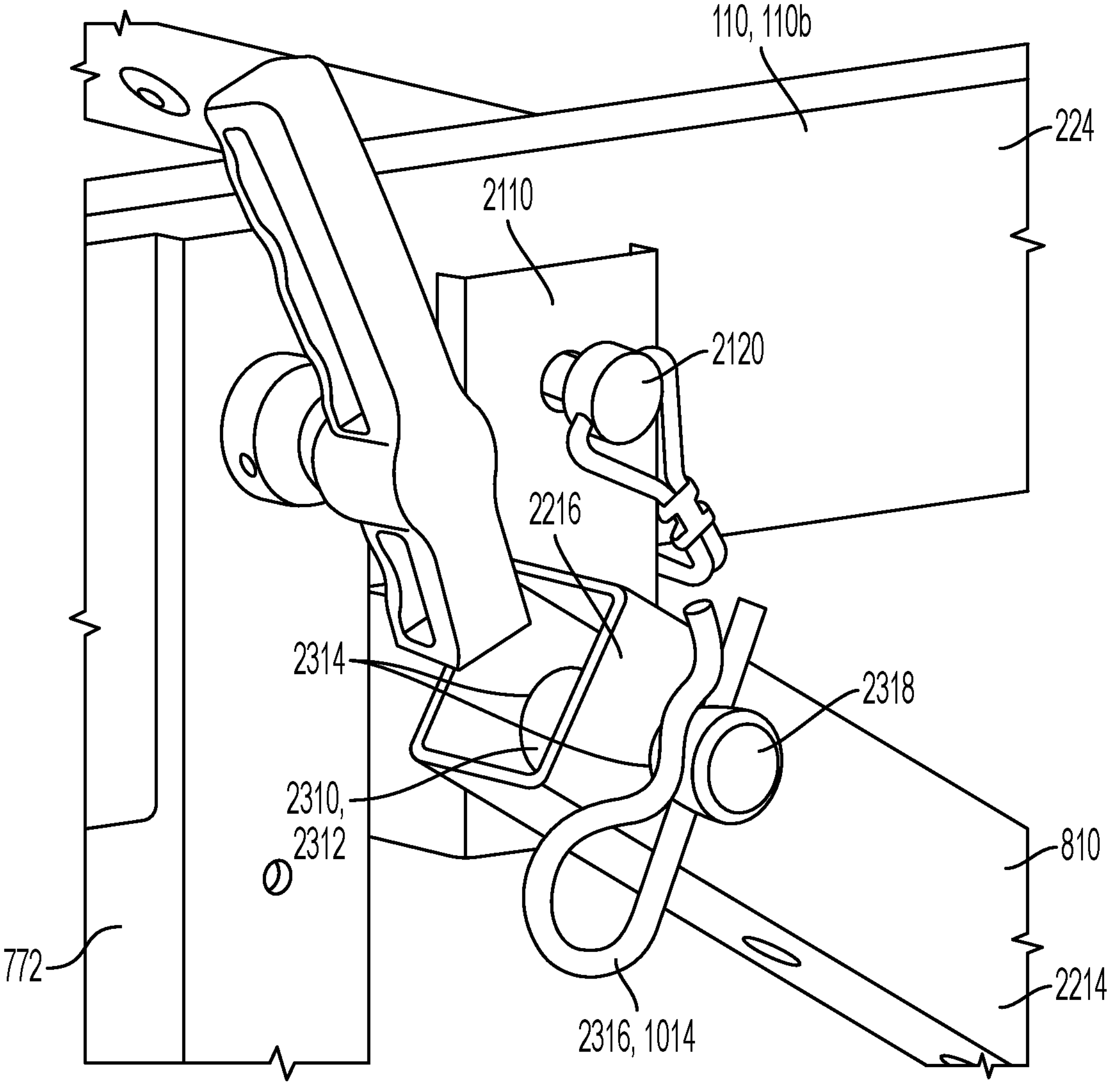
FIG. 23 illustrates a twelfth step in assembling the modular ladder system of FIG. 7.

FIG. 23 illustrates a next example step in assembling the modular ladder assembly 100 (shown in FIG. 7). Each support bracket 2110 can be coupled to the corresponding first step rail segment 224 of the corresponding ladder module 110 (e.g., the second ladder module 110*b*) by the support fastener 2120. In the present aspect, a singular support rod 2310 can span a width of the ladder module 110 to each engage each of the base openings 2126 (shown in FIG. 21) formed through the support brackets 2110. However, in other aspects, a pair of the support rods 2310 can be provided, and each support rod 2310 can engage a corresponding one of the support brackets 2110. According to example aspects, the support rod 2310 can define opposing rod end portions 2312, and each of the rod end portions 2312 can extend outward beyond the corresponding support bracket 2110.

Each of the support braces 810 can be coupled to a corresponding one of the support brackets 2110. As shown, each support brace 810 can define a rod opening 2314 therethrough for receiving the corresponding rod end portion 2312 of the support rod 2310. The rod opening 2314 can be formed through the inner brace tube 2214 proximate to the first brace end 2216 of the support brace 810. The rod end portion 2312 can extend through the rod opening 2314, and a rod fastener 2316 can be secured to support rod 2310 at a distal rod end 2318 thereof to retain the support brace 810 on the support rod 2310. In example aspects, the rod fastener 2316 can be another one of the cotter pins 1014. In other aspects, the rod fastener 2316 can comprise any other suitable fastener or fastening technique known in the art.

Figure 24:
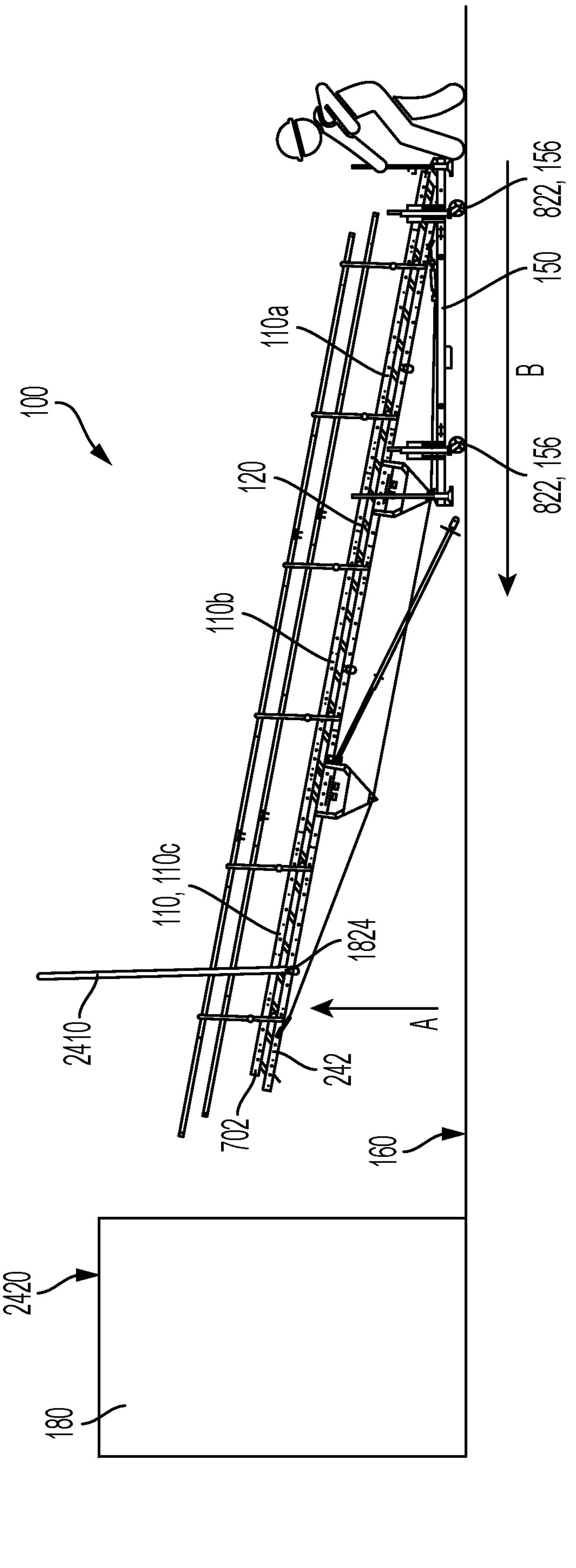
FIG. 24 illustrates a thirteenth step in assembling the modular ladder system of FIG. 7.

FIG. 24 illustrates a next example step in assembling the modular ladder assembly 100. According to example aspects, a hoisting sling 2410 can be attached to the hoisting rings 1824 (shown in FIG. 18) at the first and second module sides 242, 244 (second module side 224 shown in FIG. 2) of the third ladder module 110*c*. In other aspects, the hoisting sling 2410 can be attached to the hoisting rings 1824 on a different one of the ladder modules 110, such as the first or second ladder module 110*a,b*. A crane, forklift, or other equipment can engage and raise the hoisting sling 2410 to lift the first ladder end 702 of the ladder 120 upward, as indicated by the directional arrow A. As the first ladder end 702 is raised, the ladder base 150 can be repositioned on the ground surface 160 as needed to move the ladder 120 closer to the elevated structure 180, as indicated by the directional arrow B. The ladder base 150 can be repositioned by rolling the base wheels 822 of the wheel assemblies 156 across the ground surface 160. The first ladder end 702 can be raised to a suitable height to rest on a desired elevated support surface 2420 of the elevated structure 180. In example aspects, the ladder base 150 can be further repositioned towards or away from the elevated structure 180 to ensure that the first ladder end 702 properly engages the elevated support surface 2420, as described in further detail with respect to FIG. 25.

Figure 25:
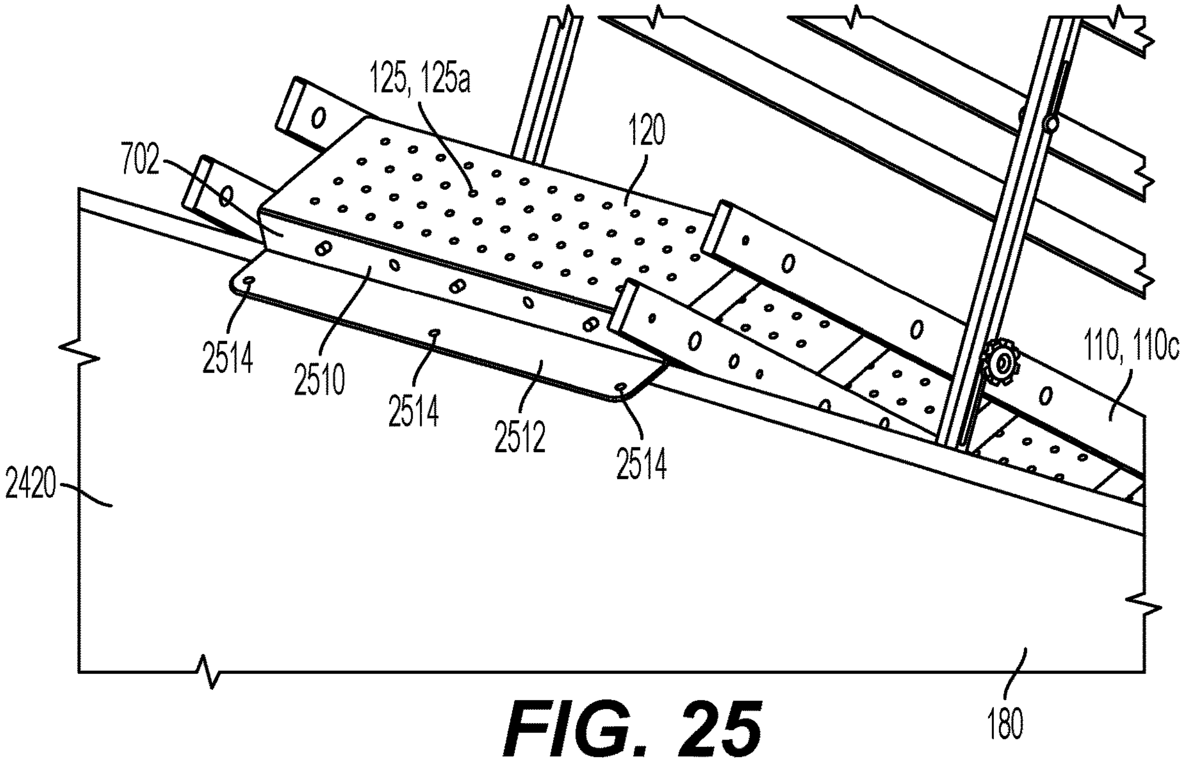
FIG. 25 illustrates a fourteenth step in assembling the modular ladder system of FIG. 7.

FIG. 25 illustrates a next example step in assembling the modular ladder assembly 100 (shown in FIG. 7). According to example aspects, the ladder 120 can comprise an attachment bracket 2510 at the first ladder end 702 thereof. In some aspects, the attachment bracket 2510 can be coupled to or formed monolithically with (i.e., formed as a singular component that constitutes a single material without joints or seams) an uppermost one of the ladder steps 125*a*, as shown. In other aspects, the attachment bracket 2510 can be located elsewhere on the ladder 120. The attachment bracket 2510 can be configured to rest on the elevated support surface 2420. An attachment portion 2512 of the attachment bracket 2510 can be configured to lay substantially flat against the elevated support surface 2420 when properly engaged therewith. If the attachment portion 2512 is not lying substantially flat against the elevated support surface 2420, the first ladder end 702 can be raised/lowered as needed by raising/lowering the hoisting sling 2410 (shown in FIG. 24) and/or the first ladder end 702 can be moved towards/away from the elevated structure 180 as needed by rolling the ladder base 150 (shown in FIG. 7) forward/rearward.

In example aspects, the attachment portion 2512 of the attachment bracket 2510 can comprise one or more attachment openings 2514 formed therethrough. An attachment fastener can extend through each of the attachment openings 2514 and can engage the elevated support surface 2420 of the elevated structure 180 to couple the attachment bracket 2510 to the elevated support surface 2420. The modular ladder assembly 100 can thereby be secured to the elevated structure 180. In example aspects, each of the attachment fasteners can be a wedge anchor, for example and without limitations. In other aspects, the attachment fasteners can be any other suitable fastener or fastening technique known in the art. Once the modular ladder assembly 100 is secured to the elevated structure 180, the wheel assemblies 156 (shown in FIG. 7) can be disengaged from the ground surface 160 (shown in FIG. 7) and locked in the disengaged position, as previously described.

Figure 26:
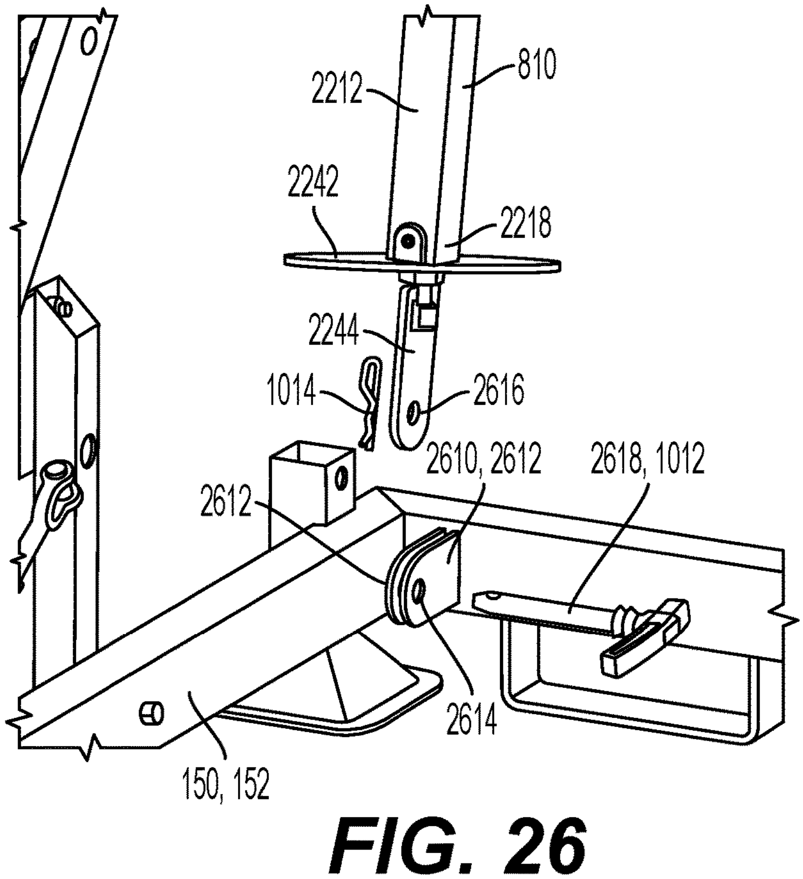
FIG. 26 illustrates a fifteenth step in assembling the modular ladder system of FIG. 7.

FIG. 26 illustrates a next example step in assembling the ladder module assembly 100 (shown in FIG. 7). The brace mounting tab 2244 of each support brace 810 can be secured to the ladder base 150 to extend each support brace 810 substantially vertically between the ladder base 150 and the second ladder module 110*b* (shown in FIG. 7). In some aspects, the substantially vertical base posts 155 (shown in FIG. 8) can be detached from the ladder base 150 prior to attaching the support braces 810 to the ladder base 150 to facilitate the installation thereof. The base posts 155 can be detached from the ladder base 150 in the manner previously described, and then reattached after installing the support braces 810.

As shown, each brace mounting tab 2244 can hang from the outer brace tube 2212 at the second brace end 2218 of the corresponding support brace 810. The ladder base 150, and more specifically the base frame 152, can define a pair of mounting brackets 2610. Each of the brace mounting tabs 2244 can be coupled to a corresponding one of the mounting brackets 2610. For example, in the present aspect, each of the mounting brackets 2610 can comprise a pair of base mounting tabs 2612 extending from the base frame 152. The base mounting tabs 2612 can be substantially parallel with one another, as illustrated. Each of the base mounting tabs 2612 can define a base tab opening 2614 formed therethrough. Each of the brace mounting tabs 2244 can define a brace tab opening 2616 formed therethrough.

To attach each brace mounting tab 2244 to the corresponding mounting bracket 2610, the brace mounting tab 224 can be inserted between the corresponding base mounting tabs 2612. The length of the support brace 810 can be selectively adjusted as needed, as previously described, to allow the brace mounting tab 2244 to be positioned between the base mounting tabs 2612. The brace tab opening 2616 of the brace mounting tab 2244 can be aligned with the corresponding base tab openings 2614 of the base mounting tabs 2612. A mounting fastener 2618 can extend through each of the base tab openings 2614 and the brace tab opening 2616 to secure the brace mounting tab 2244 to the mounting bracket 2610. In the present aspect, the mounting fastener 2618 can comprise an additional one of the pull pins 1012 and an additional one of the cotter pins 1014. In other aspects, the mounting fastener 2618 can comprise any other suitable fastener or fastening technique known in the art. Once the support brace 810 is secured to the ladder base 150, the tensioning plate 2242 can be rotated to bias the tensioning plate 2242 against the second brace end 2218 of the support brace 810, thereby tensioning the corresponding support brace 810 between the ladder base 150 and second ladder module 110*b*, as needed.

Figure 27:
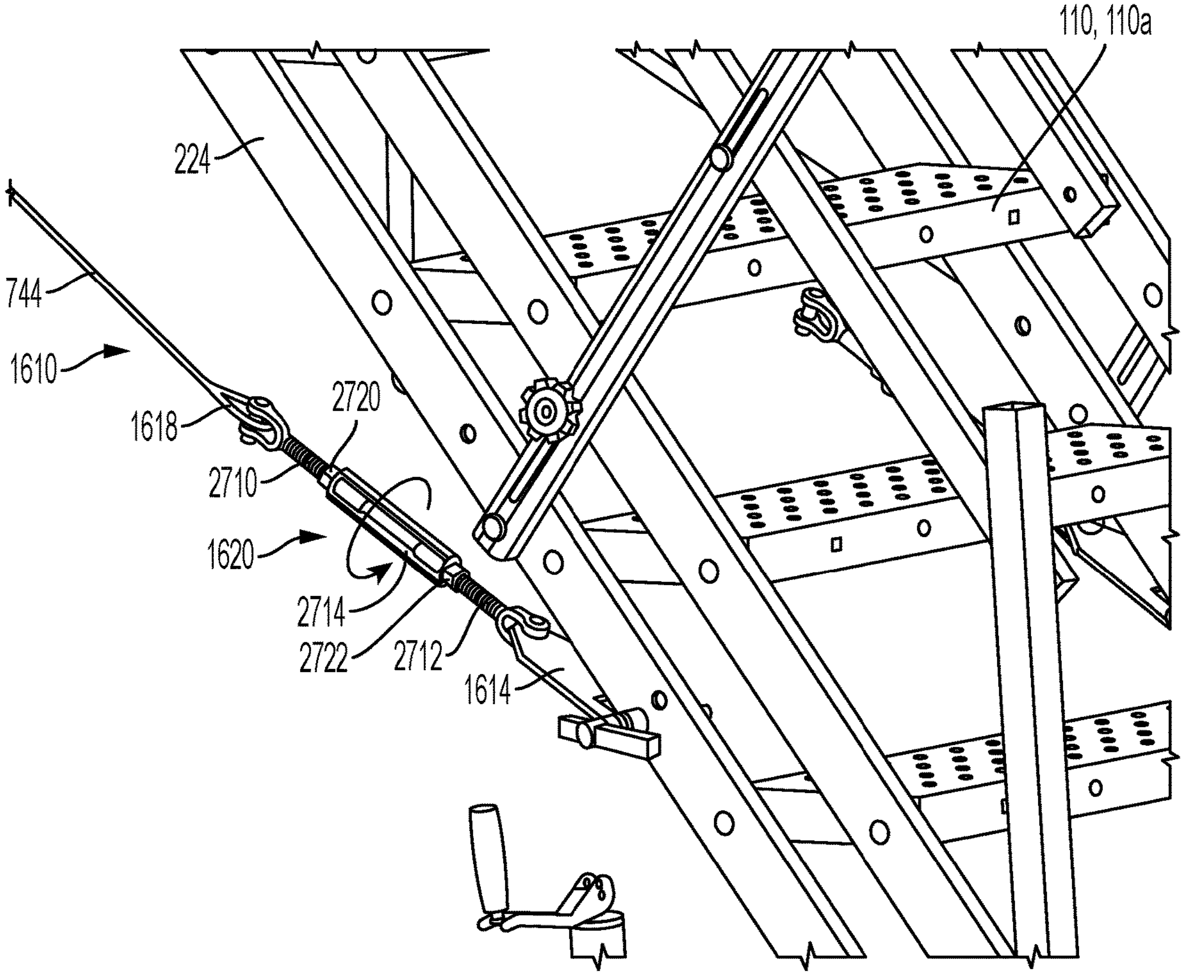
FIG. 27 illustrates a sixteenth step in assembling the modular ladder system of FIG. 7.

FIG. 27 illustrates a next example step in assembling the modular ladder system 100 (shown in FIG. 7). The second cable bracket 1614 of each cable assembly 1610 can be coupled to the corresponding first step rail segments 224 of the first ladder module 110*a* in substantially the same manner that the first cable brackets 1612 (shown in FIG. 16) were coupled to the corresponding first step rail segments 224 of the third ladder module 110*c* (shown in FIG. 7), as previously described. In example aspects, each of the cable assemblies 1610 can comprise the cable tensioner 1620 for tensioning the corresponding tensioning cable 774. Each of the cable tensioners 1620 comprising a first threaded bolt 2710, a second threaded bolt 2712, and a rotatable tensioning handle 2714. The tensioning handle 2714 can define a threaded bore formed therethrough.

The first threaded bolt 2710 can be coupled to the second cable end 1618 of the tensioning cable 774 and can engage the threaded bore at a first handle end 2720 of the tensioning handle 2714. The second threaded bolt 2712 can be coupled to the second cable bracket 1614 and can engage the threaded bore at an opposite second handle end 2722 of the tensioning handle 2714. The tensioning handle 2714 can thereby be disposed between and can rotatably engage each of the first and second threaded bolts 2710, 2712. To tension the tensioning cable 774, the tensioning handle 2714 can be rotated to thread each of the first and second threaded bolts 2710, 2712 deeper into the threaded bore. Tensioning the tensioning cable 774, which extends between the first ladder module 110*a* and the third ladder module 110*c*, can ensure that ladder modules 110 are properly tensioned.

Figure 28:
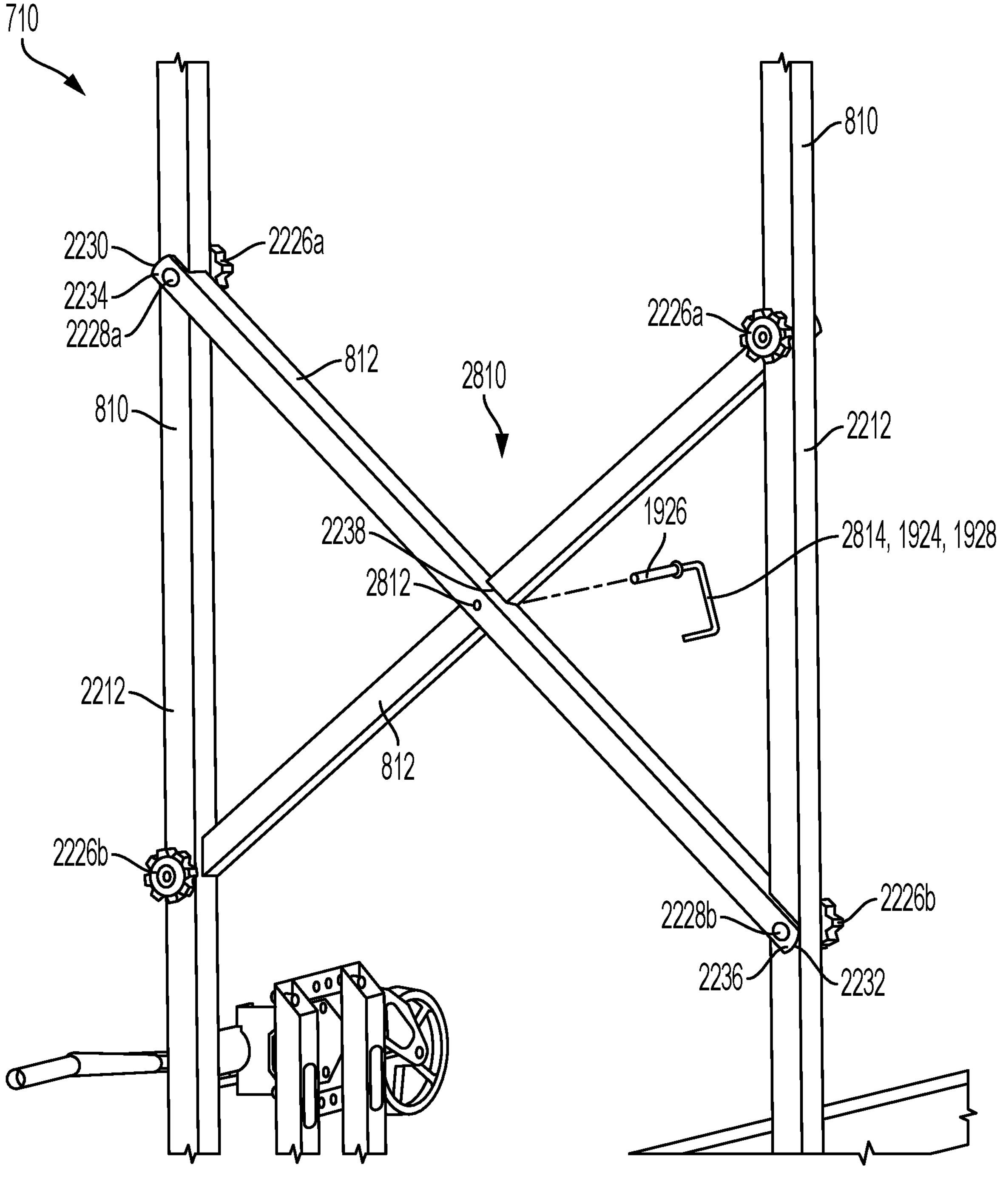
FIG. 28 illustrates a seventeenth step in assembling the modular ladder system of FIG. 7.

FIG. 28 illustrates a next example step in assembling the modular ladder system 100 (shown in FIG. 7). The cross members 812 of the base support assembly 710 can be attached to the support braces 810. Each of the cross members 812 can define the first member end 2230 and the second member end 2232. The first coupling tab 2234 at the first member end 2230 of each cross member 812 can be coupled to a corresponding one of the support braces 810 by the corresponding first brace tensioning knob 2226*a* and the first tensioning carriage bolt 2228*a*. Similarly, the second coupling tab 2236 at the second member end 2232 of each cross member 812 can be coupled to a corresponding one of the support braces 810 by the corresponding second brace tensioning knob 2226*b* and the second tensioning carriage bolt 2228*b*. Each of the first and second brace tensioning knobs 2226*a,b* can be rotated to tension the cross members 812 with the outer brace tubes 2212, as needed.

Furthermore, the nesting notches 2238 of the cross members 812 can nest with one another when the cross members 812 are mounted to the support braces 810 to define an X-shaped cross member assembly 2810. The nesting notches 2238 can aid in prohibiting movement of the cross members 812. In some aspects, the cross members 812 can further be affixed to one another at the nesting notches 2238. For example, a cross member hole 2812 can be defined through each of the cross members 812 at the corresponding nesting notch 2238. A cross member fastener 2814 can engage each of the cross member holes 2812 to secure the cross members 812 together. In the present aspect, the cross member fastener 2814 can be another one of the safety pins 1924 comprising the pin rod 1926 and the flexible pin lock 1928. In other aspects, the cross member fastener 2814 can comprise any other suitable type of fastener or fastening technique.

Figure 29:
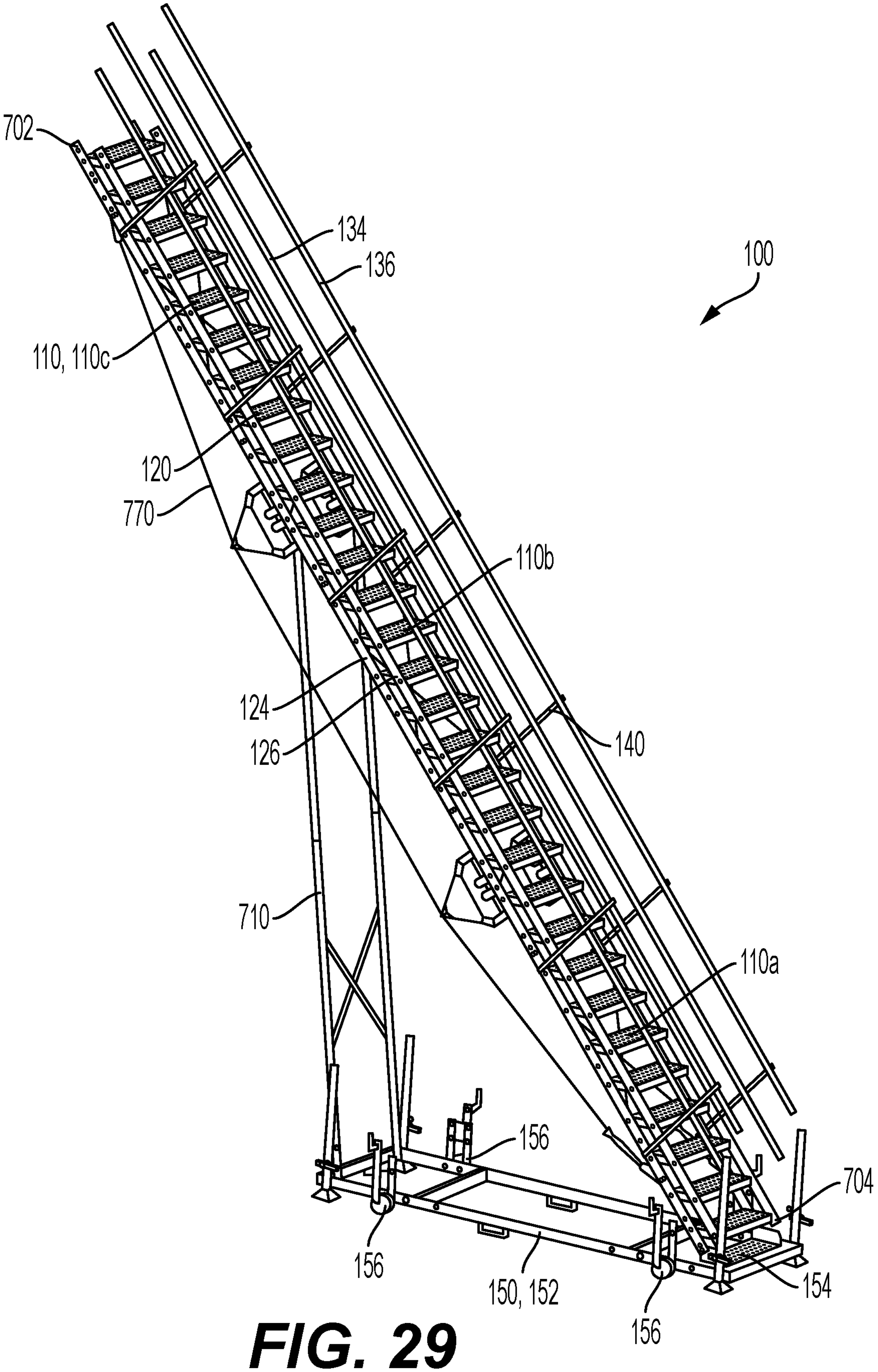
FIG. 29 illustrates a perspective view of the modular ladder system of FIG. 7 in the assembled configuration.

FIG. 29 is a perspective view of the modular ladder system 100 that has been assembled according to the steps previously described.

Figure 30A:
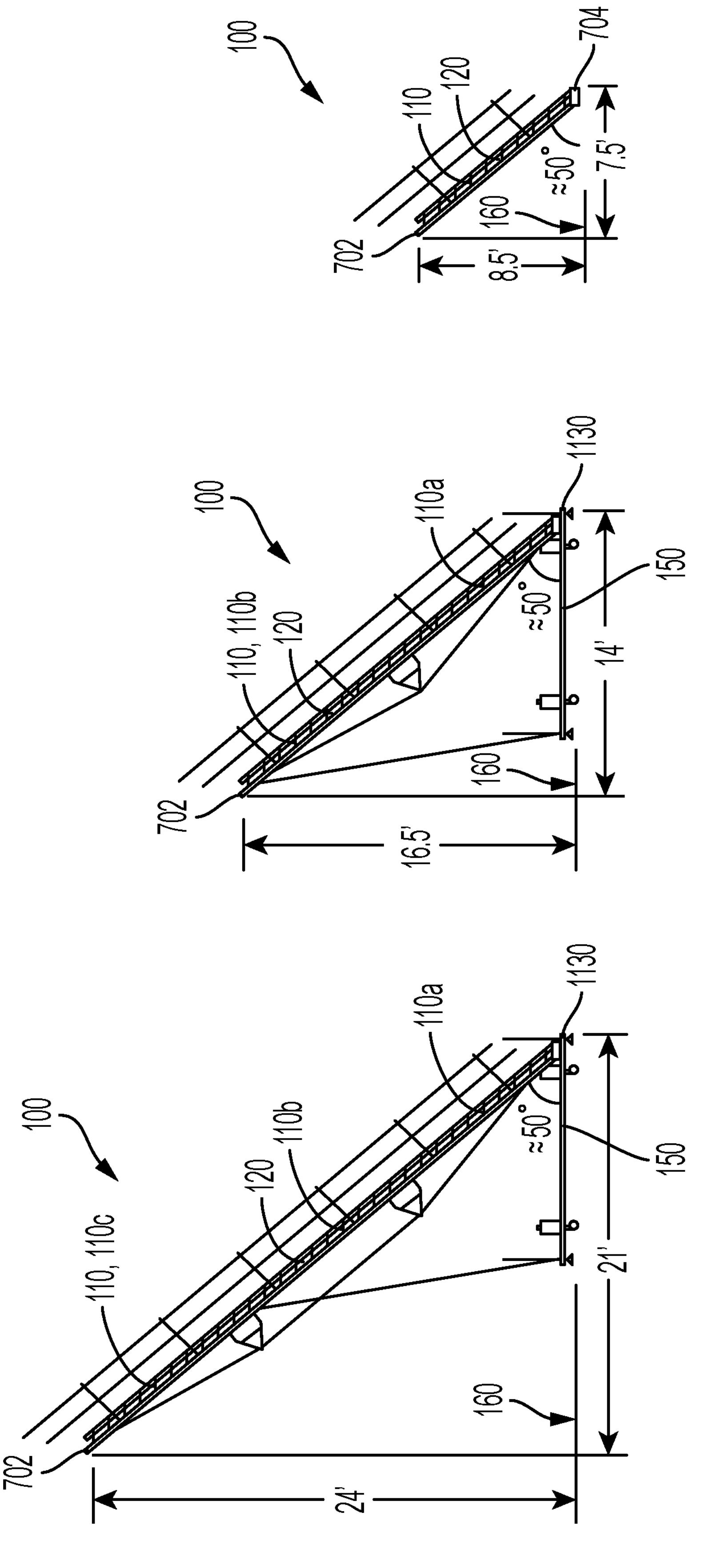
FIG. 30A illustrates a side view of the modular ladder system oriented at a first example angle relative to the ground and comprising a varying number of ladder modules, in accordance with another example aspect of the present disclosure.

FIG. 30A illustrates example dimensions (in feet) of the modular ladder system 100 when the ladder 120 is disposed at approximately a 50° angle relative to the ground surface 160. In some aspects, a modular ladder system 100 comprising three of the ladder modules 110 (e.g., the first, second, and third ladder modules 110*a,b,c*) and oriented at approximately 50° relative to the ground surface 160 can define a height of about 24' and a width of about 21'. In some aspects, a modular ladder system 100 comprising two of the ladder modules 110 (e.g., the first and second ladder modules 110*a,b*) and oriented at approximately 50° relative to the ground surface 160 can define a height of about 16.5' and a width of about 14'. The height can be measured vertically in the present aspect from the ground surface 160 to the first ladder end 702 of the ladder 120. The width in the present aspect can be measured horizontally from the first ladder end 702 to the rear base end 1130 of the ladder base 150.

In some aspects, the modular ladder system 110 may comprise only one of the ladder modules 110, which can be utilized separate from the ladder base 150. In such aspects, the second ladder end 704 may be configured to rest on the ground surface 160. In example aspects, a modular ladder system 100 comprising one of the ladder modules 110 and oriented at approximately 50° relative to the ground surface 160 can define a height of about 8.5' and a width of about 7.5'. In the present aspect, the width can be measured horizontally from the first ladder end 702 to the second ladder end 704. All of the dimensions disclosed herein are merely exemplary and should not be construed as limiting.

Figure 30B:
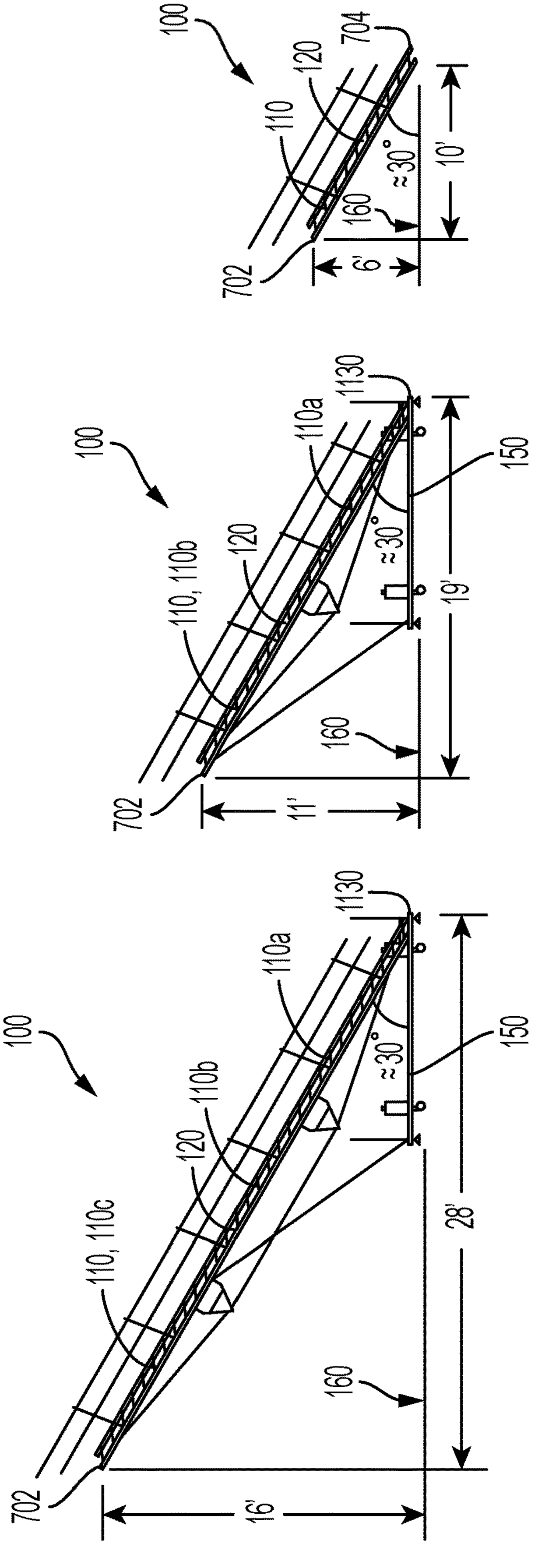
FIG. 30B illustrates a side view of the modular ladder system oriented at a second example angle relative to the ground and comprising a varying number of the ladder modules, in accordance with another example aspect of the present disclosure.

FIG. 30B illustrates example dimensions (in feet) of the modular ladder system 100 when the ladder 120 is disposed at approximately a 30° angle relative to the ground surface 160. In some aspects, a modular ladder system 100 comprising three of the ladder modules 110 (e.g., the first, second, and third ladder modules 110*a,b,c*) and oriented at approximately 30° relative to the ground surface 160 can define a height of about 16' and a width of about 28'. In some aspects, a modular ladder system 100 comprising two of the ladder modules 110 (e.g., the first and second ladder modules 110*a,b*) and oriented at approximately 30° relative to the ground surface 160 can define a height of about 11' and a width of about 19'. Again, the height can be measured in the present aspect from the ground surface 160 to the first ladder end 702 of the ladder 120. The width in the present aspect can be measured from the first ladder end 702 to the rear base end 1130 of the ladder base 150.

In some aspects, the modular ladder system 110 may comprise only one of the ladder modules 110, which can be utilized separate from the ladder base 150. In such aspects, the second ladder end 704 may be configured to rest on the ground surface 160. In example aspects, a modular ladder system 100 comprising one of the ladder modules 110 and oriented at approximately 30° relative to the ground surface 160 can define a height of about 6' and a width of about 10'. In the present aspect, the width can be measured horizontally from the first ladder end 702 to the second ladder end 704. All of the dimensions disclosed herein are merely exemplary and should not be construed as limiting.

Figure 31:
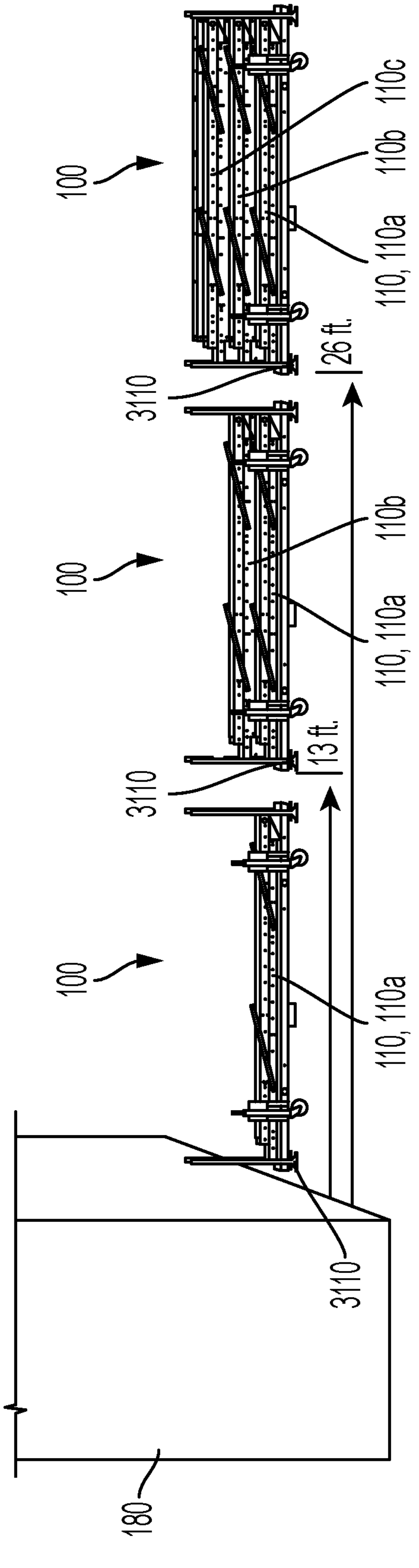
FIG. 31 illustrates a side view of the modular ladder system comprising a varying number of the ladder modules and spaced at varying example distances from a building structure, in accordance with another example aspect of the present disclosure.

FIG. 31 illustrates example distances (in feet) that the modular ladder system 100 can be positioned away from the elevated structure 180 before beginning assembly of the modular ladder system 100. For example, in some aspects, a modular ladder system 100 comprising three of the ladder modules 110 (e.g., the first, second, and third ladder modules 110*a,b,c*) can be positioned at a distance of approximately 26' away from the elevated structure 180. The distance in the present aspect can be measured from the elevated structure 180 to a front base end 3110 of the modular ladder system 100 in the unassembled configuration. In some aspects, a modular ladder system 100 comprising two of the ladder modules 110 (e.g., the first and second ladder modules 110*a,b*) can be positioned at a distance of approximately 13' away from the elevated structure 180. In some aspects, a modular ladder system 100 comprising one of the ladder modules 110 (e.g., the first ladder module 110*a*) can substantially confront the elevated structure 180.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A method of assembling a modular ladder system comprising:

providing the modular ladder system in an unassembled configuration, the modular ladder system comprising a plurality of ladder modules stacked on a ladder base, the plurality of ladder modules comprising a first ladder module and a second ladder module each defining a first end and a second end opposite the first end;

removing the second ladder module from the ladder base;

coupling the first end of the first ladder module to the second end of the second ladder module to define a ladder, the ladder defining a first ladder end and a second ladder end opposite the first ladder end, the second end of the first ladder module defining the second ladder end and coupled to the ladder base;

elevating the first ladder end of the ladder to orient the ladder at an angle relative to the ladder base; and engaging the first ladder end with an elevated support surface of an elevated structure;

wherein coupling the first end of the first ladder module to the second end of the second ladder module comprises:

detaching a plurality of substantially vertical base posts from the ladder base;

attaching the plurality of substantially vertical base posts to the second ladder module to support the second ladder module above a ground surface; and laterally aligning the second ladder module with the first ladder module to facilitate coupling the first ladder module to the second ladder module.

2. The method of claim 1, wherein the ladder base further comprises at least one wheel assembly, each of the wheel assemblies comprising a base wheel, the method further comprising:

moving each of the wheel assemblies from a disengaged position to an engaged position to contact the base wheels with a ground surface; and rolling the base wheels across the ground surface to reposition the ladder base at a desired location.

3. The method of claim 2, wherein the method further comprises raising a base frame of the ladder base in the engaged position with a wheel jack of each wheel assembly.

4. The method of claim 2, further comprising moving each of the wheel assemblies from the engaged position to the disengaged position after rolling the base wheels across the ground surface to reposition the ladder base at the desired location, wherein, in the disengaged position, each of the base wheels are disengaged from the ground surface.

5. The method of claim 4, wherein:

in the disengaged position, each of the wheel assemblies is pivoted away from the ground surface relative to the ladder base; and each of the wheel assemblies further comprises a wheel pivot pin engaging each of wheel assemblies in the disengaged position to retain the wheel assembly in the disengaged position.

6. The method of claim 1, wherein the second end of the first ladder module is pivotably coupled to the ladder base, and wherein elevating the first ladder end of the ladder to orient the ladder at the angle relative to the ladder base comprises pivoting the first ladder module relative to the ladder base.

7. The method of claim 6, wherein the modular ladder system further comprises a step platform coupled to the ladder base to allow a user to step on to or off of the ladder base when ascending or descending the first ladder module.

8. The method of claim 1, further comprising assembling a base support assembly with the modular ladder system to support the ladder over the ladder base, and wherein the base support assembly comprises a first support brace extending substantially vertically between the ladder base and a one of the plurality of ladder modules and a second support brace extending substantially vertically between the ladder base and the one of the plurality of ladder modules.

9. The method of claim 8, wherein the base support assembly further comprises a first cross member and a second cross member each extending between the first support brace and the second support brace, and wherein the first cross member crosses the second cross member to define an X-shaped cross member assembly.

10. The method of claim 9, wherein:

each of the first and second cross members are coupled to the first support brace by a first brace tensioning knob;

each of the first and second cross members are coupled to the second support brace by a second brace tensioning knob; and the method further comprises rotating at least one of the first and second brace tensioning knobs to tension at least one of the first and second cross members with the first support brace and the second support brace.

11. The method of claim 1, wherein:

the ladder comprises an attachment bracket at the first ladder end;

engaging the first ladder end with the elevated support surface of the elevated structure comprising engaging an attachment portion of the attachment bracket with the elevated support surface;

the attachment portion lies substantially flat against the elevated support surface; and the method further comprises coupling the attachment portion to the elevated support surface with an attachment fastener.

12. The method of claim 1, wherein each of the ladder modules comprises:

a plurality of ladder steps;

a pair of step rail segments, each of the plurality of ladder steps extending between the pair of step rail segments; and a pair of hand rail segments, each of the hand rail segments supported above and substantially parallel to a corresponding one of the pair of step rail segments.

13. The method of claim 12, wherein:

each of the hand rail segments is pivotably coupled to the corresponding one of the pair of step rail segments by a linkage;

the method further comprises rearranging each of the ladder modules from a collapsed configuration to an expanded configuration;

in the collapsed configuration, each of the hand rail segments is pivoted at the linkage towards the corresponding one of the pair of step rail segments; and in the expanded configuration, each of the hand rail segments is pivoted at the linkage away from the corresponding one of the pair of step rail segments.

14. The method of claim 13, wherein each of the ladder modules further comprises a pair of guard rail segments, wherein each of the guard rail segments is supported on a corresponding one of the linkages between the corresponding one of the pair of step rail segment and the corresponding one of the pair of hand rail segments.

15. The method of claim 14, wherein:

the pair of step rail segments is a pair of first step rail segments;

the ladder module further comprises a pair of second step rail segments;

each of the second step rail segments is supported on a corresponding one of the linkages between the corresponding one of the pair of first step rail segments and the corresponding one of the pair of guard rail segments; and each of the second step rail segments is arranged adjacent to and substantially parallel with the corresponding one of the first step rail segments.

16. The method of claim 12, wherein:

the modular ladder system further comprises a cable tensioning system comprising a tensioning cable and a cable tensioner;

the tensioning cable extends between and is coupled to at least the first ladder module and one of the plurality of ladder modules that is different from the first ladder module and that is farthest from the ladder base; and the method further comprises tensioning the tensioning cable with the cable tensioner.

17. The method of claim 16, wherein:

the cable tensioning system further comprises a truss assembly;

the method further comprises mounting the truss assembly to a first step rail segment of the pair of step rail segments of the first ladder module and to a second step rail segment of the pair of step rail segments of the second ladder module at a step rail splice point between the first ladder module and the second ladder module; and the truss assembly reinforces and at least partially covers the step rail splice point; and the tensioning cable engages the truss assembly.

18. The method of claim 12, wherein:

the pair of step rail segments of the first ladder module comprises a first step rail segment, and the pair of step rail segments of the second ladder module comprises a second step rail segment; and the method comprises engaging a splice plate with an open front end of the first step rail segment at the first end of the first ladder module and engaging the splice plate with an open rear end of the second step rail segment at the second end of the second ladder module to couple the first step rail segment to the second step rail segment.

19. The method of claim 1, wherein:

the ladder further comprises a hand rail;

the method further comprises mounting a splice cuff to the hand rail at a hand rail splice point between the first ladder module and the second ladder module; and the splice cuff reinforces and at least partially covers the hand rail splice point.

20. A method of assembling a modular ladder system comprising:

providing the modular ladder system in an unassembled configuration, the modular ladder system comprising a plurality of ladder modules stacked on a ladder base, the plurality of ladder modules comprising a first ladder module and a second ladder module each defining a first end and a second end opposite the first end;

removing the second ladder module from the ladder base;

coupling the first end of the first ladder module to the second end of the second ladder module to define a ladder, the ladder defining a first ladder end and a second ladder end opposite the first ladder end, the second end of the first ladder module defining the second ladder end and coupled to the ladder base;

elevating the first ladder end of the ladder to orient the ladder at an angle relative to the ladder base;

engaging the first ladder end with an elevated support surface of an elevated structure; and assembling a base support assembly with the modular ladder system to support the ladder over the ladder base;

wherein:

the base support assembly comprises a first support brace extending substantially vertically between the ladder base to a one of the plurality of ladder modules and a second support brace extending substantially vertically between the ladder base and the one of the plurality of ladder modules;

the base support assembly further comprises a first cross member and a second cross member each extending between the first support brace and the second support brace;

the first cross member crosses the second cross member to define an X-shaped cross member assembly;

each of the first and second cross members are coupled to the first support brace by a first brace tensioning knob;

each of the first and second cross members are coupled to the second support brace by a second brace tensioning knob; and the method further comprises rotating at least one of the first and second brace tensioning knobs to tension at least one of the first and second cross members with the first support brace and the second support brace.

21. A method of assembling a modular ladder system comprising:

providing the modular ladder system in an unassembled configuration, the modular ladder system comprising a plurality of ladder modules stacked on a ladder base, the plurality of ladder modules comprising a first ladder module and a second ladder module each defining a first end and a second end opposite the first end;

removing the second ladder module from the ladder base;

coupling the first end of the first ladder module to the second end of the second ladder module to define a ladder, the ladder defining a first ladder end and a second ladder end opposite the first ladder end, the second end of the first ladder module defining the second ladder end and coupled to the ladder base;

elevating the first ladder end of the ladder to orient the ladder at an angle relative to the ladder base; and engaging the first ladder end with an elevated support surface of an elevated structure wherein:

each of the ladder modules comprises:

a plurality of ladder steps;

a pair of step rail segments, each of the plurality of ladder steps extending between the pair of step rail segments; and a pair of hand rail segments, each of the hand rail segments supported above and substantially parallel to a corresponding one of the pair of step rail segments;

the modular ladder system further comprises a cable tensioning system comprising a tensioning cable and a cable tensioner;

the tensioning cable extends between and is coupled to at least the first ladder module and one of the plurality of ladder modules that is different from the first ladder module and that is farthest from the ladder base;

the method further comprises tensioning the tensioning cable with the cable tensioner;

the cable tensioning system further comprises a truss assembly;

the method further comprises mounting the truss assembly to a first step rail segment of the pair of step rail segments of the first ladder module and to a second step rail segment of the pair of step rail segments of the second ladder module at a step rail splice point between the first ladder module and the second ladder module; and the truss assembly reinforces and at least partially covers the step rail splice point; and the tensioning cable engages the truss assembly.

* * * * *